Sept. 1, 1970     R. O. THOMAS     3,526,308
CHECK CONTROLLED DISPENSING MACHINE WITH
ARTICLE SELECTION INDICATOR
Original Filed Aug. 3, 1966     10 Sheets-Sheet 1
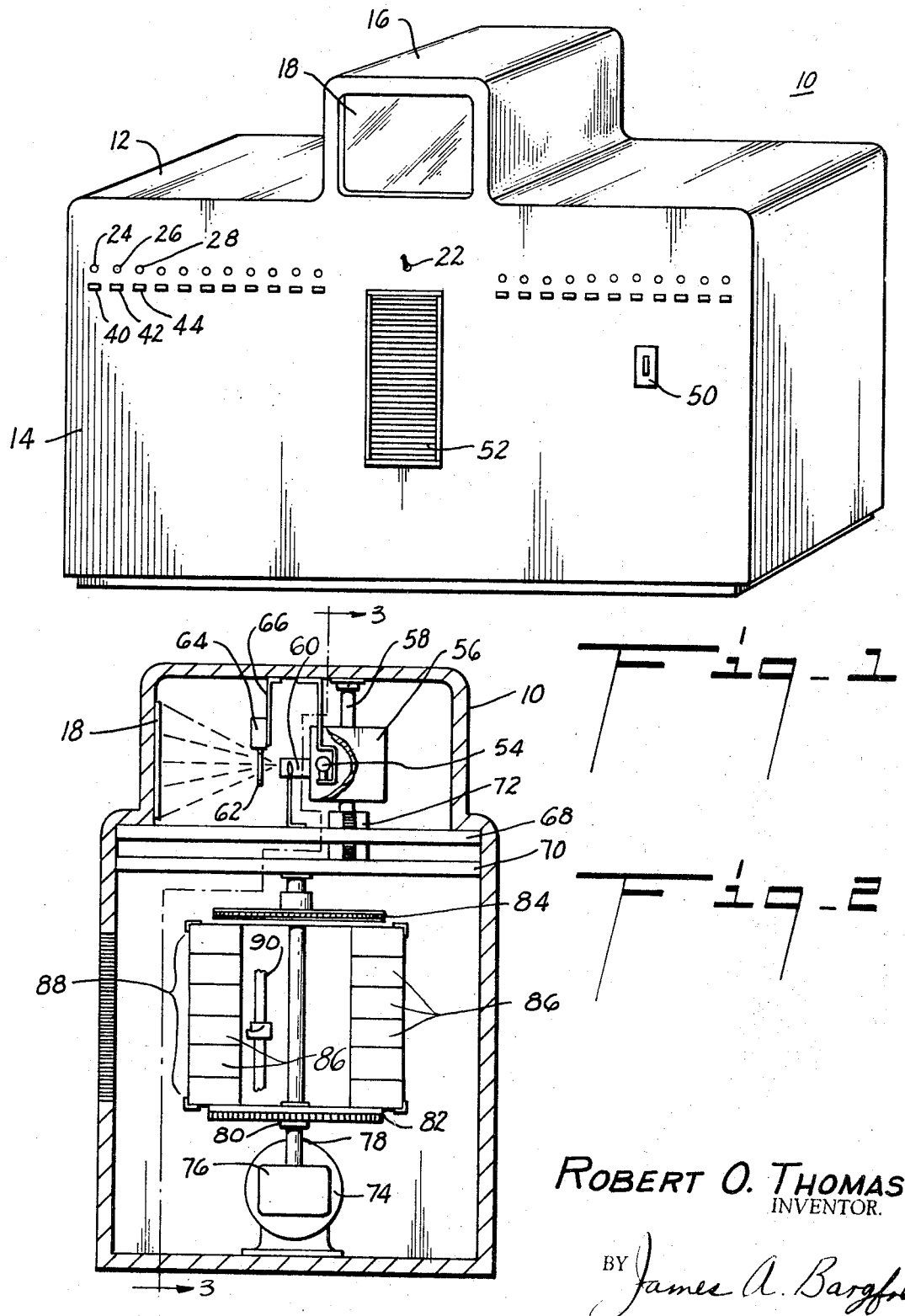
Robert O. Thomas
INVENTOR.
BY James A. Bargfrede
ATTORNEY

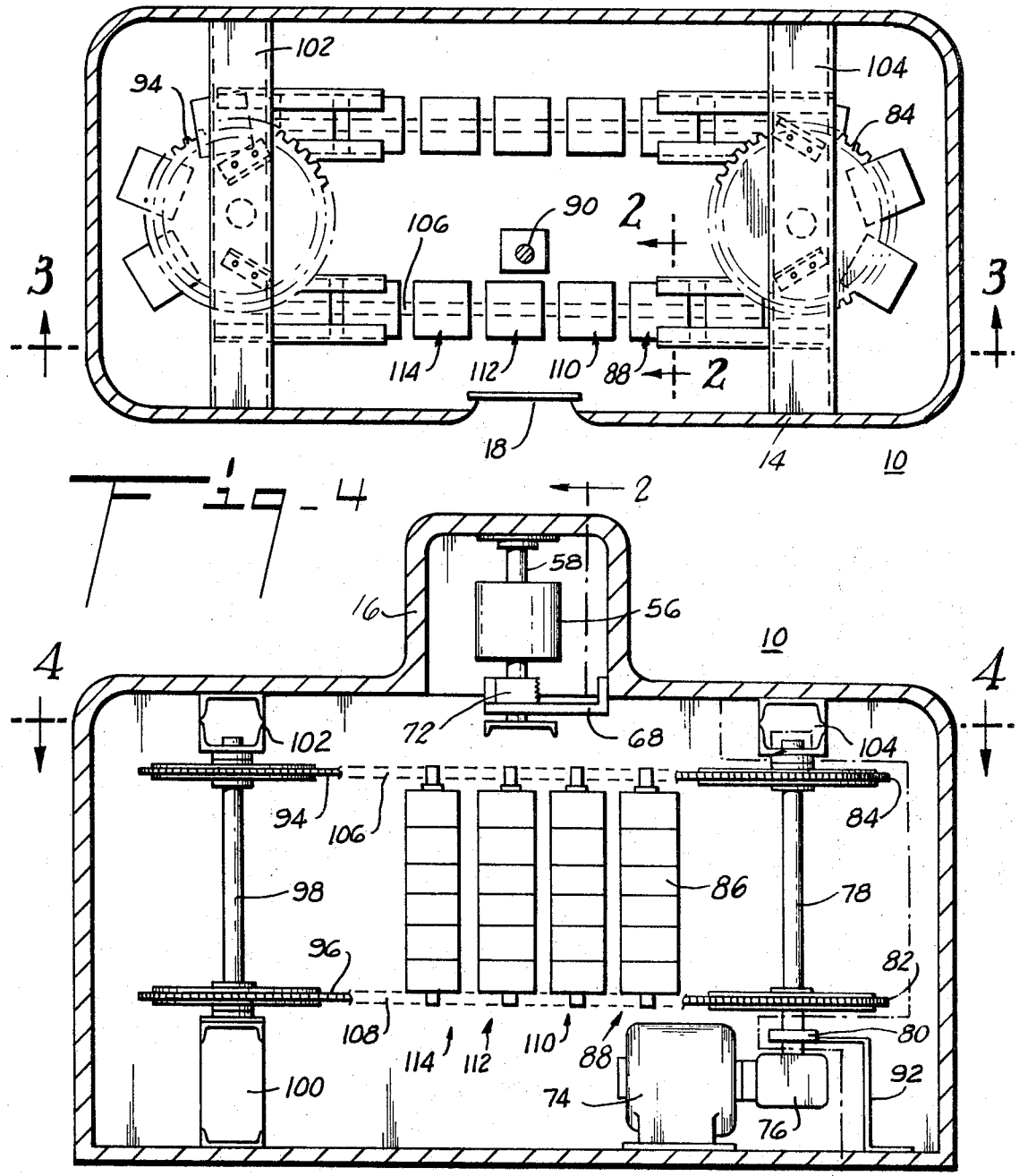

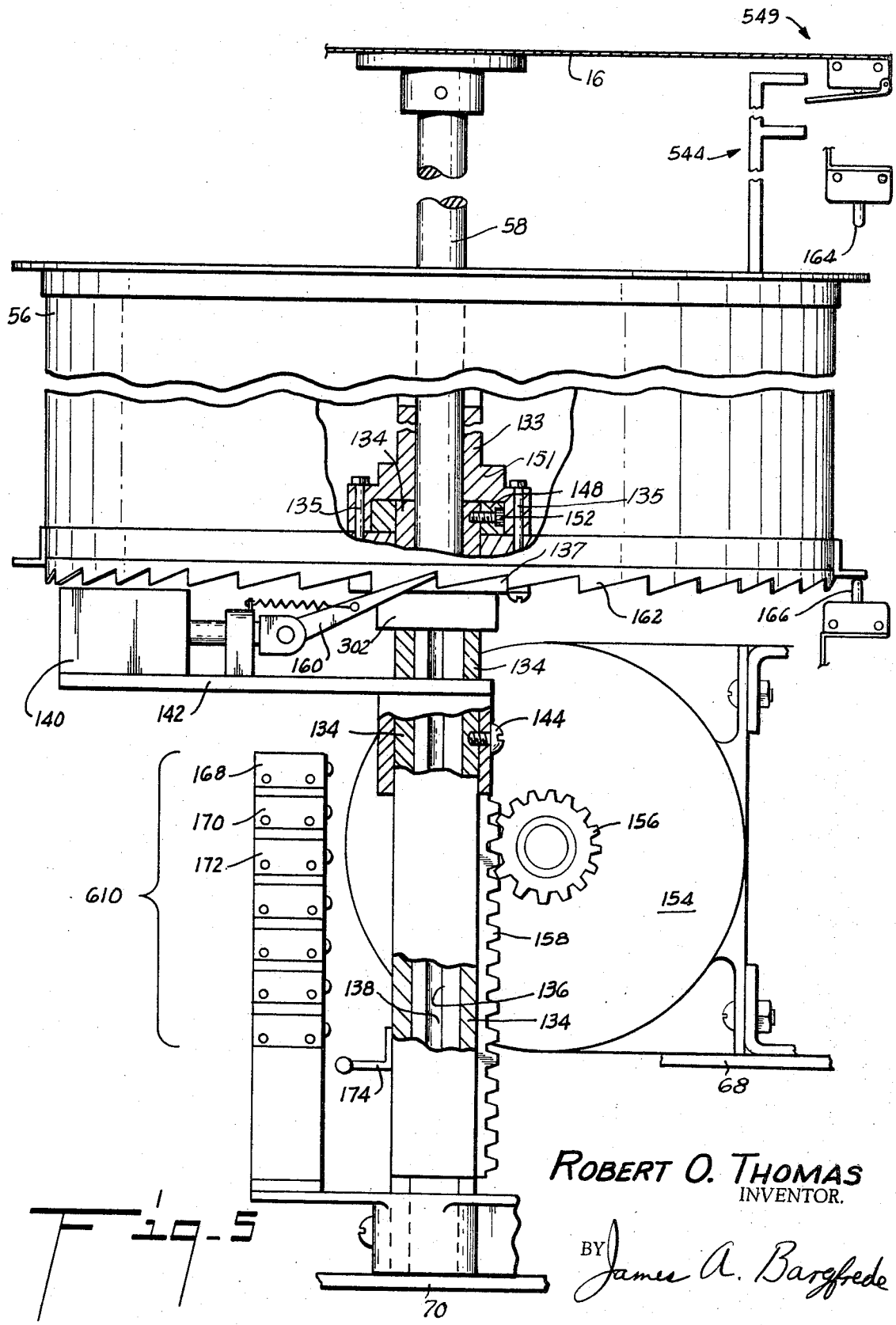

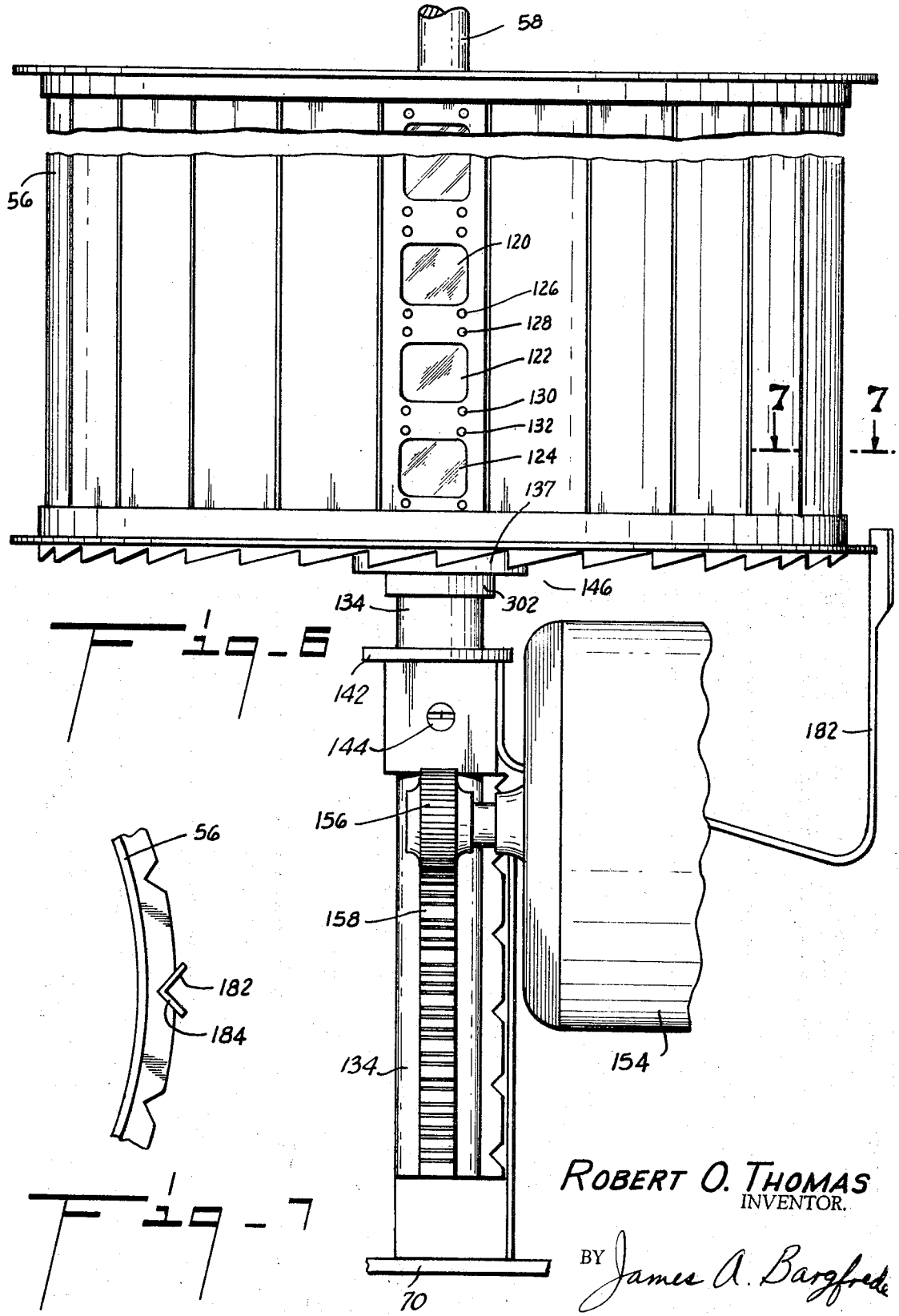

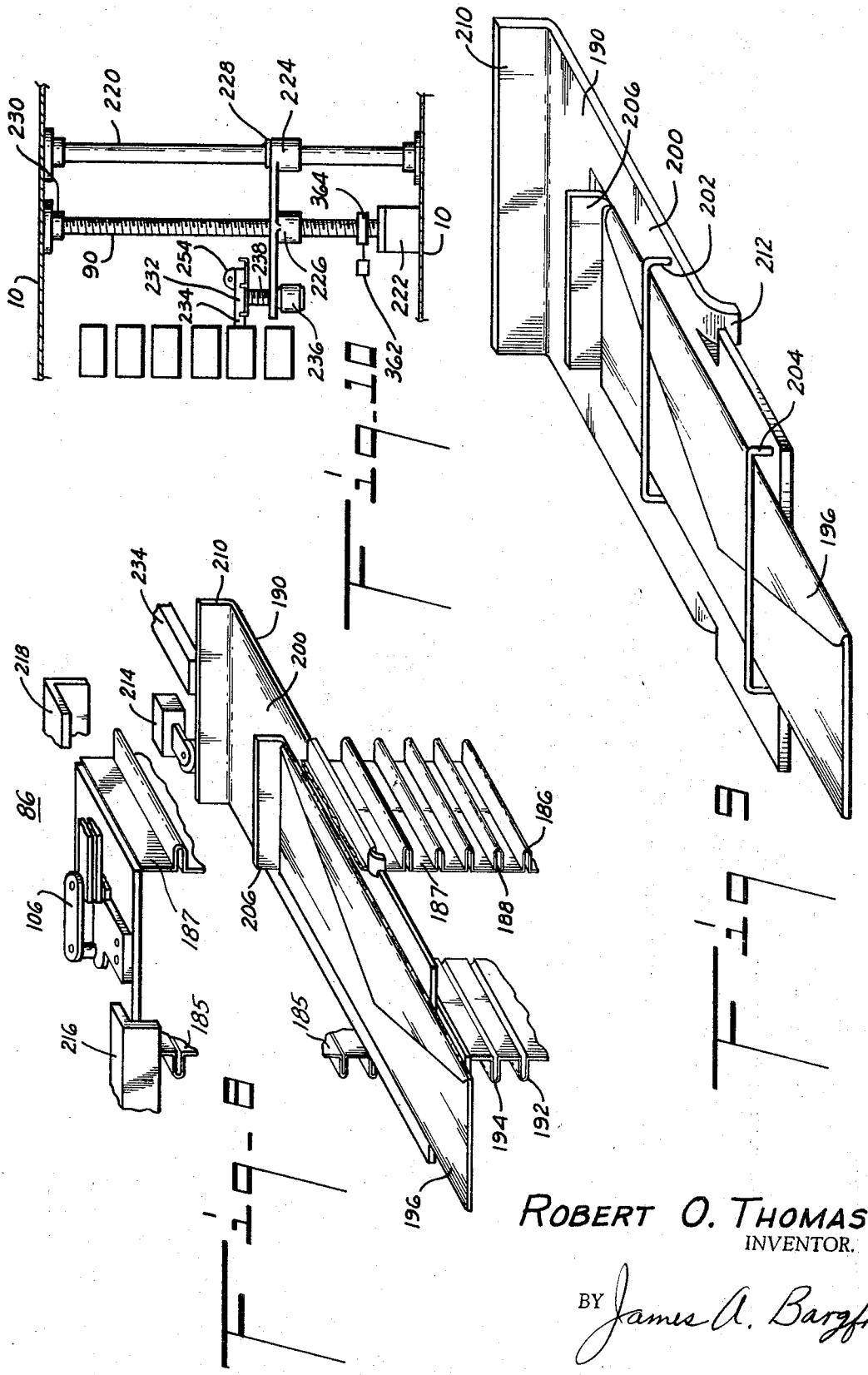

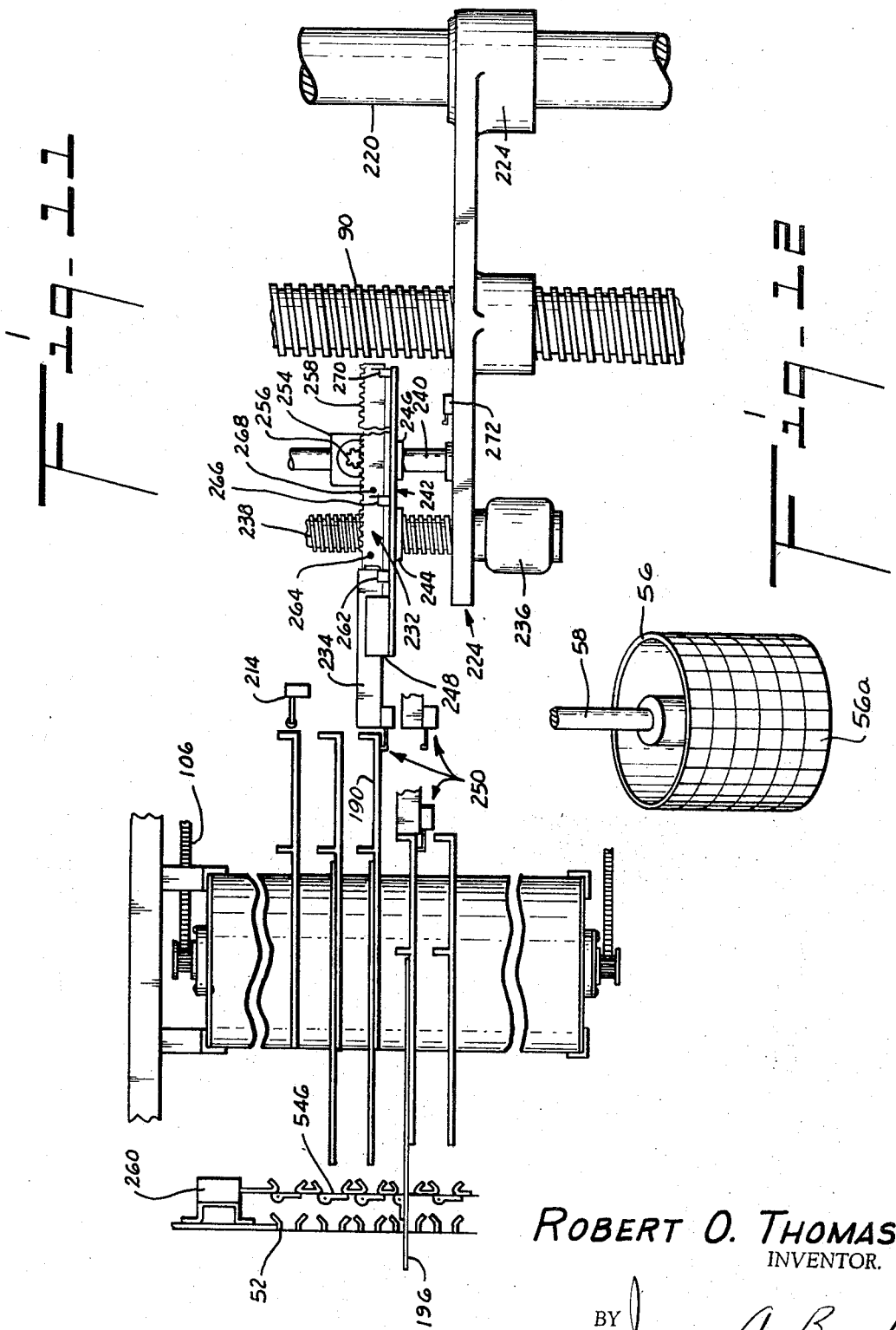

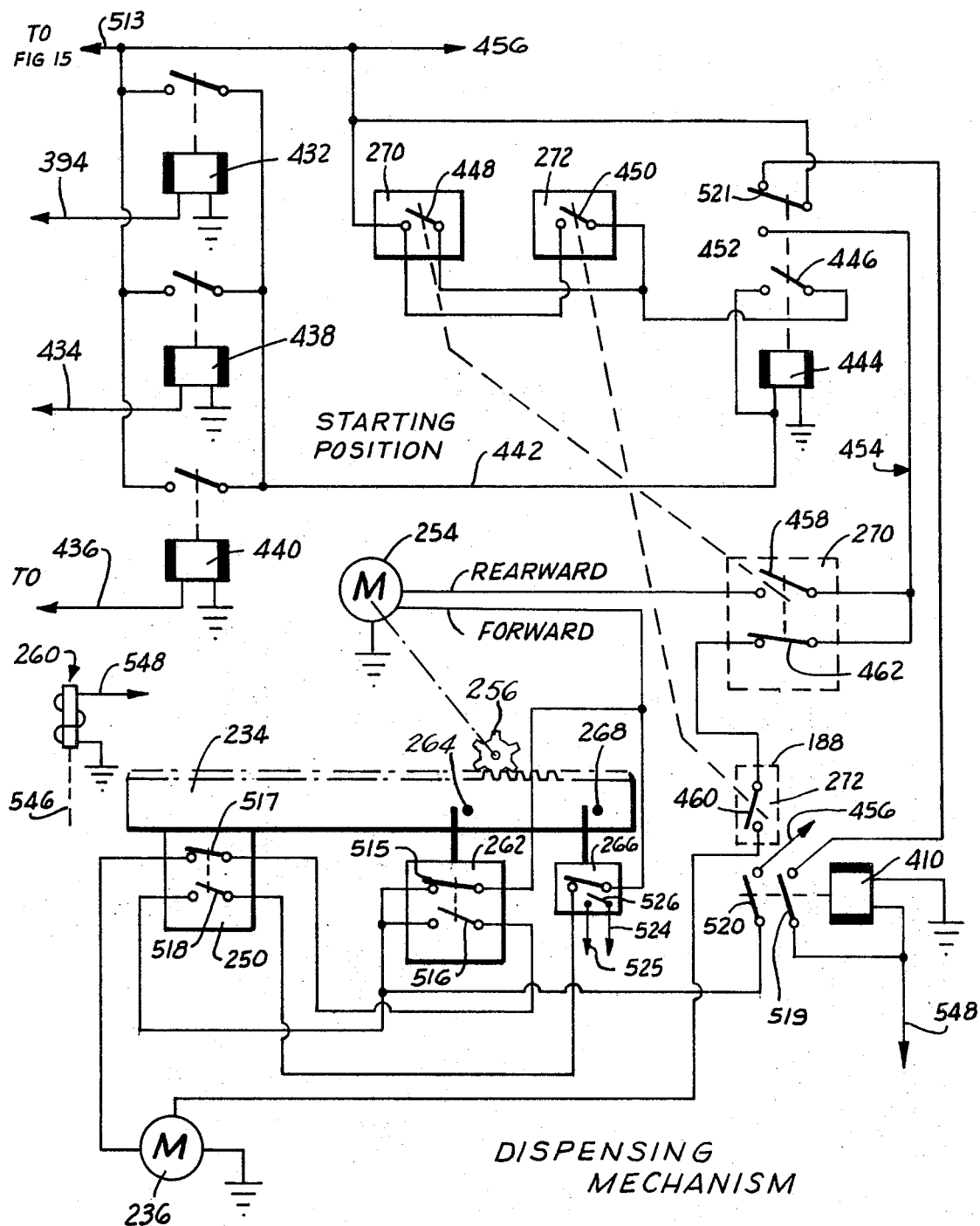

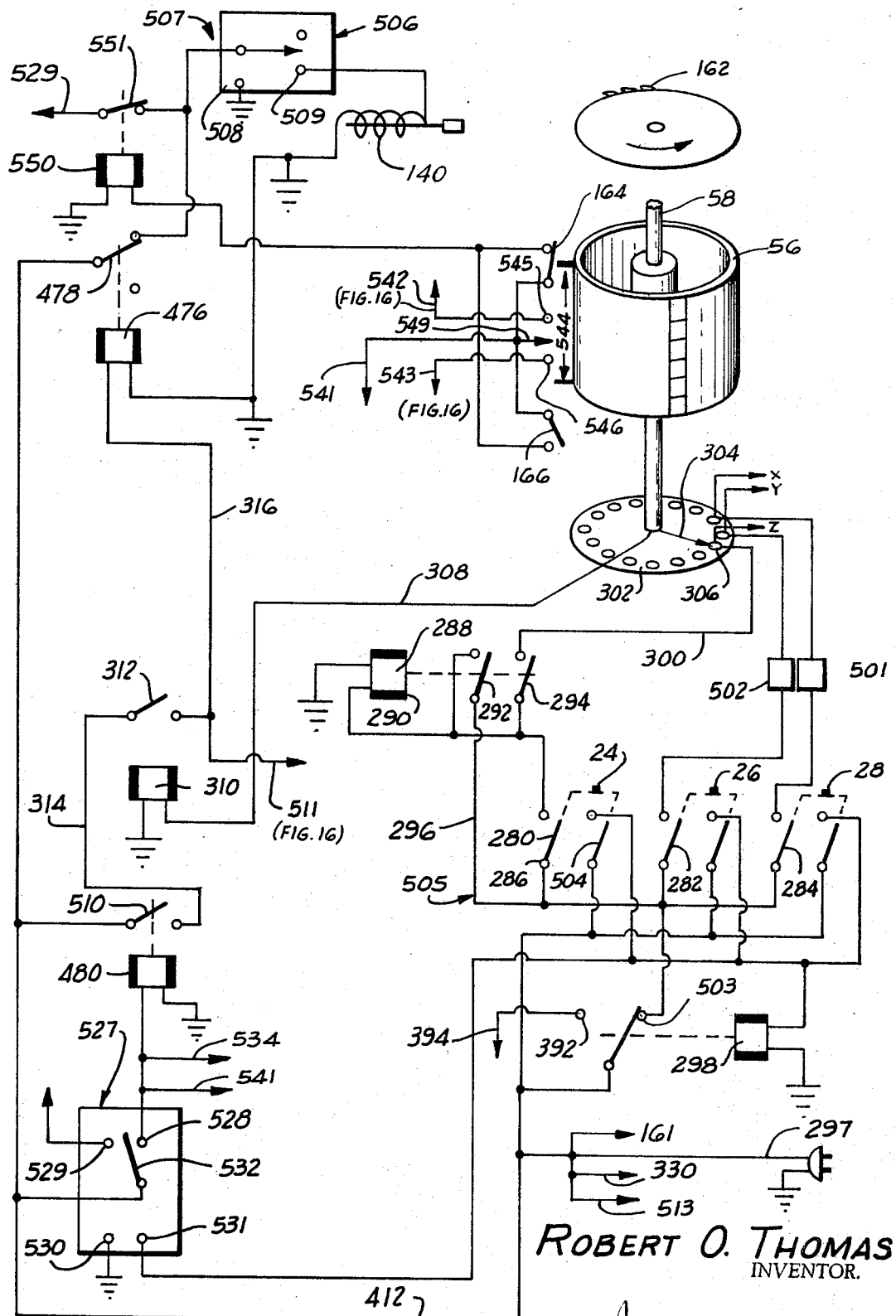

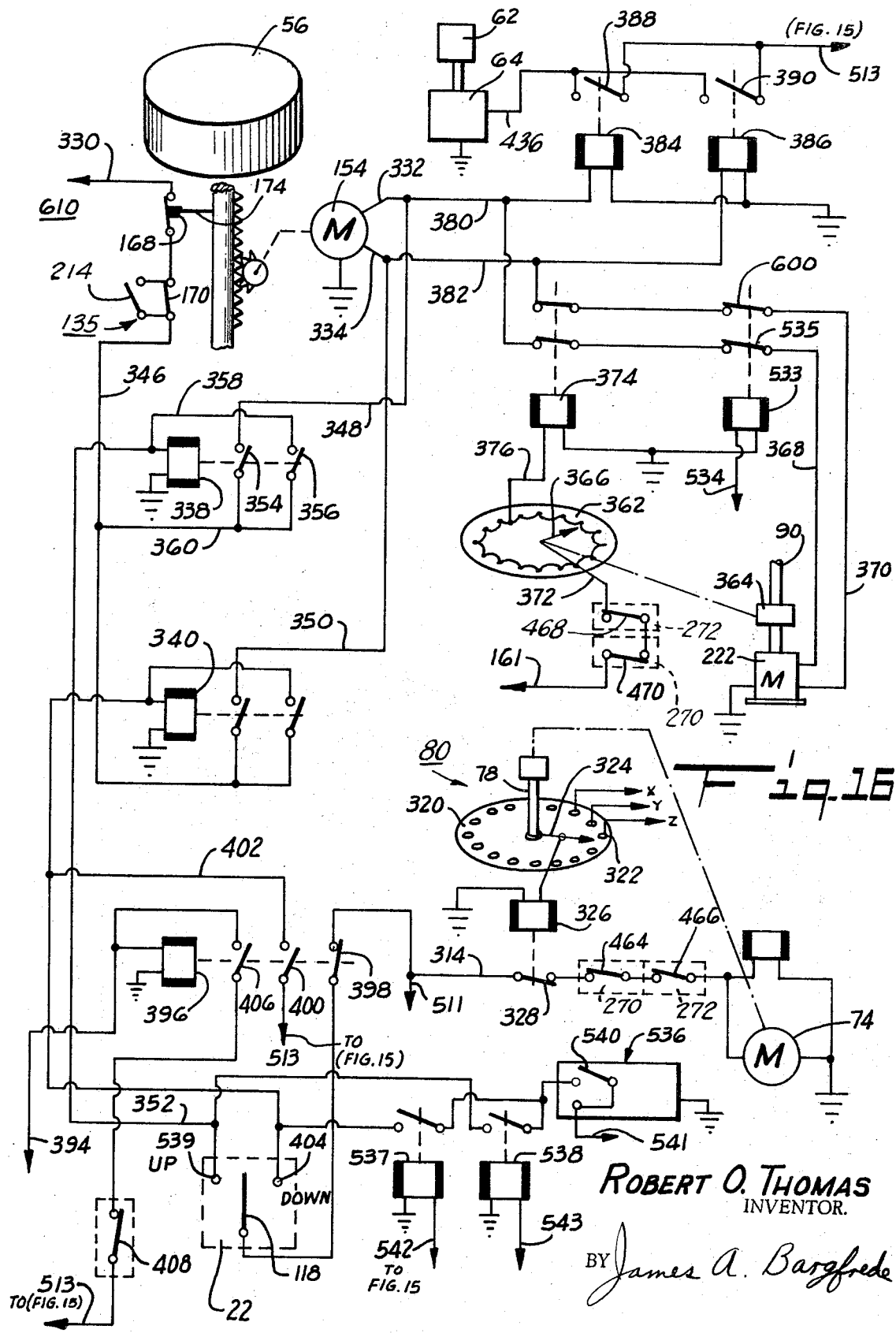

United States Patent Office 3,526,308
Patented Sept. 1, 1970

3,526,308
CHECK CONTROLLED DISPENSING MACHINE WITH ARTICLE SELECTION INDICATOR
Robert O. Thomas, 1022 Alamo,
San Marcos, Tex. 78666
Continuation of application Ser. No. 570,003, Aug. 3, 1966. This application Mar. 26, 1968, Ser. No. 716,231
Int. Cl. G07f 11/00
U.S. Cl. 194—10                            32 Claims

ABSTRACT OF THE DISCLOSURE

A dispensing system having an advertising mode, a selecting mode, and buying mode. The advertising mode is utilized when the machine is not being operated by a prospective buyer. The selecting mode is utilized when a customer is selecting an item for delivery from the machine. The buying mode is utilized when the dispensing machine is delivering an item of merchandise.

CROSS REFERENCES TO RELATED APPLICATIONS

This application is a continuation of my prior copending application Ser. No. 570,003 entitled "Dispensing Machine" filed Aug. 3, 1966, now abandoned.

BACKGROUND OF THE INVENTION

Field of the invention

This invention pertains generally to dispensing machines and particularly to machines adapted for presenting a variety of substantially flat objects in visual form to allow selection of one or more of such substantially flat items.

Description of the prior art

During the past few years greeting cards have increased in use and the occasions on which greeting cards may be sent also have increased. At the present time selection of greeting cards generally has been a cumbersome, time consuming, and haphazard event. Most greeting card dispensers are merely racks or drawers having indexed areas in which various types of greeting cards are positioned. It is necessary for an individual making a greeting card selection to laboriously go through the group of greeting cards in certain categories such as birthday, get well, friendship, and sympathy categories. After a particular card type has been selected a prospective purchaser must obtain a sample card from the file in which the cards are stored and view such sample card. In some instances even though a sample card meets with the approval of the prospective purchaser, such prospective purchaser finds that the card selected is out of stock or worn from handling and the search for another card must begin. Although the greeting card selection problem is challenging, the selection and dispensing of other elongated substantially flat objects presents problems similar to those problems encountered in the selection of greeting cards. For example, clothing patterns are difficult to select and obtain with the equipment available prior to the present invention.

Although various vending machines and dispensing devices have been provided prior to the present invention, such vending machines and dispensing devices have not provided the display, selection, and positive action for a large number of substantially flat objects provided by the dispensing machine of the present invention. Some of the prior art devices related to the present invention are disclosed in the following U.S. Patents:

2,556,338, issued June 12, 1951; 2,655,242, issued Oct. 13, 1953; 2,890,781, issued June 16, 1959; 3,002,602, issued Oct. 3, 1961; 3,156,340, issued Nov. 10, 1964.

As pointed out previously, although the devices disclosed in the above mentioned U.S. patents provide vending functions, none of such devices achieve the result obtained by the present invention. Also none of such prior art devices disclose or suggest the structure and operation of the device of the present invention.

Thus, an object of the present invention is to provide an improved dispensing apparatus.

Another object of the present invention is to provide a machine for vending substantially flat, elongated items which may vary in size.

Yet another object of the present invention is to provide a dispensing machine for substantially flat, elongated objects wherein such objects are advertised through suitable means for attracting the attention of a prospective purchaser.

A still further object of the present invention is to provide a dispensing machine having a positive dispensing feature which assures a customer of obtaining the item selected by such customer.

Another object of the present invention is to provide a dispensing machine which may be maintained easily and which is foolproof in operation while being relatively simple to manufacture.

BRIEF DESCRIPTION OF THE DRAWING

In the drawings, FIG. 1 is a front perspective view showing the dispensing machine of the present invention;

FIG. 2 is a sectional partially schematic end view of the dispensing machine of the present invention;

FIG. 3 is a sectional side view of the dispensing machine of the present invention;

FIG. 4 is a sectional top view of the dispensing machine of the present invention taken along line 4—4 of FIG. 3;

FIG. 5 is a partial sectional side view of the slide drum control mechanism of the present invention;

FIG. 6 is an end view of the slide drum control mechanism shown in FIG. 5;

FIG. 7 is a top view showing the detents taken along line 7—7 of FIG. 6;

FIG. 8 is a perspective view in detail showing the category banks which store a supply of elongated substantially flat objects in accordance with the present invention;

FIG. 9 is a perspective view in detail showing a card storage plate with a card in place;

FIG. 10 is a side view in detail showing the card dispensing mechanism of the present invention;

FIG. 11 is an elevational view showing a side view of the card dispensing mechanism;

FIG. 12 is a perspective top view showing a slide drum;

FIG. 14 is a circuit diagram showing a portion of the circuit utilized in the present invention;

FIG. 15 is a circuit diagram showing a portion of the circuit utilized in the present invention; and FIG. 16 is a circuit diagram showing a portion of the circuit utilized in the dispensing machine of the present invention.

SUMMARY OF THE INVENTION

Figure 13:
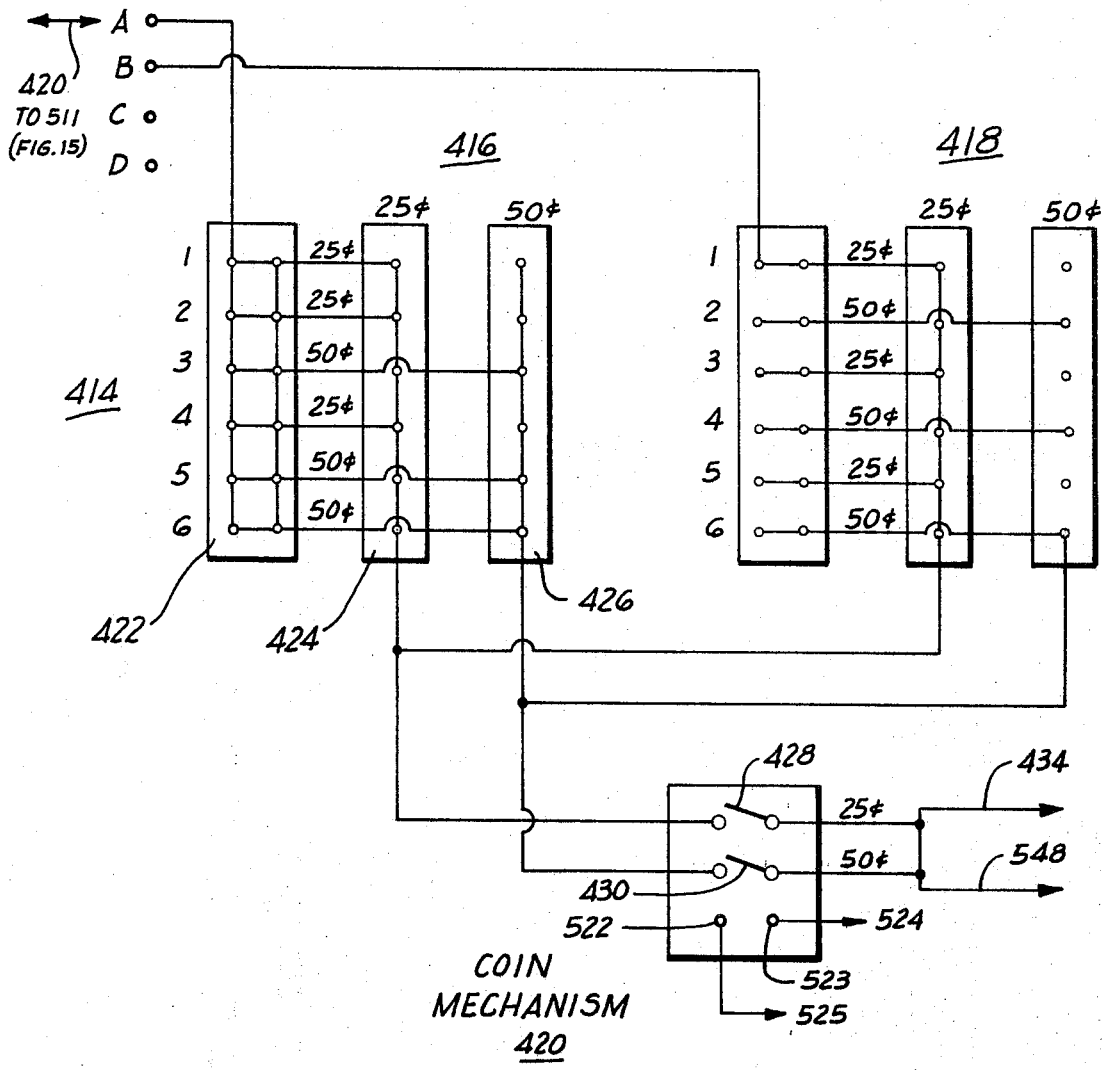
FIG. 13 is a circuit diagram of a portion of the circuit utilized in the dispensing machine of the present invention.

Briefly stated, the present invention provides a dispensing mechanism having three modes of operation. These three modes are the advertising mode, the selecting mode and the buying mode. The dispensing machine of the present invention is utilized for selectively providing visual presentation to a prospective customer of items available for purchase from such dispensing machine, means for selecting and purchasing a particular item, and means for positively dispensing the selected item. The advertising mode of the dispensing machine of the present invention is utilized when the machine is not being operated by a prospective buyer. The selecting mode of the dispensing machine of the present invention is utilized when a customer is selecting an item for delivery from the machine and the buying mode is utilized when the dispensing machine of the present invention is delivering a particular item. After the buying mode has been completed the dispensing machine of the present invention returns to the advertising mode and remains in such advertising mode until the selecting mode is actuated.

DESCRIPTION OF THE PREFERRED EMBODIMENT

General description

Referring now to the drawings in detail, FIG. 1 is a front perspective view showing the dispensing machine 10 of the present invention. The dispensing machine 10 includes a housing 12 having a front portion 14 and a viewer portion 16 positioned on the upper portion of housing 12. Viewing portion 16 includes a viewing screen 18 which will be explained in detail subsequently. A card selector switch 22 is positioned on front panel 14 of housing 12. A plurality of category selector switches such as 24, 26, and 28 are positioned horizontally along front panel 14. Category identification nameplates such as 40, 42, and 44 are disposed below category selector switches such as 24, 26 and 28 and provide category identification information. For example, if the dispensing machine of the present invention is utilized to dispense greeting cards, various categories of greeting cards might be indicated such as birthday, friendship and humorous categories might be indicated. A coin slot 50 is shown on front panel 14 of the dispensing machine 10 and card or item delivery slots identified generally as 52 are positioned substantially in the central portion of the front panel 14 of the dispensing machine 10.

Briefly stated the dispensing machine shown in FIG. 1 in the advertising mode provides visual presentation on screen 18 of the items available in the dispensing machine 10. A prospective or actual purchaser selects a category of cards by depressing one of the selector switches such as 24, 26 or 28. By actuating card selector switch 22, a picture of each card is presented on screen 18 and displays both the outside and inside of the card. When a card is desired to be purchased, the purchaser inserts money in coin slot 50. The dispensing mechanism in the dispensing machine 10 causes the selected card to be pushed through one of the card delivery slots 52 and the purchase is completed. After a selected period of time if additional cards have not been purchased, the dispensing machine 10 returns to the advertising mode utilized when the machine is idle.

FIG. 2 is a sectional end elevational view of the dispensing machine of the present invention. Screen 18 is shown opposite a light source 54 positioned inside slide drum 56 mounted on drum shaft 58. Lens 60 is positioned intermediate light source 54 and blackout plate 62. Blackout plate 62 is positioned near blackout solenoid 64 which may be suspended by a suitable bracket 66 from the upper portion of housing 10. The function and operation of blackout plates 62 and 64 will be explained in detail subsequently in connection with the electrical circuit of the present invention but suffice it to say for the present time that the blackout solenoid and the blackout plate prevent indication on screen 18 of a card or other items stored in the machine when such card or other item has been sold out.

A suitable plate 68 extends across the upward portion of housing 10 as well as plate 70. Plates 68 and 70 provide support for support member 72. Support member 72 allows positioning of the slide drum 56 in a manner to be explained subsequently.

In the lower portion of housing 10 is positioned a motor 74. Motor 74 is coupled to a speed reducer 76. Shaft 78 extends from the speed reducer 76 to a rotary switch 80. Shaft 78 is coupled to sprocket 82 and sprocket 84 to allow movement of the card banks 86 which are disposed in vertical stacks, e.g. six banks to each stack. Each stack, such as 88, corresponds to a particular category of cards and may be called a category stack. Worm 90 provides vertical movement to the card dispensing mechanism as will be explained in detail subsequently. It will be apparent from viewing FIG. 2, however, that the drive motor 74 along with speed reducer 76 provides rotation of shaft 78 thereby causing the category stacks to move to a selected position which will allow a card or other items to be dispensed from the machine in a manner to be explained subsequently.

Rotary switch 80 is part of the electrical control mechanism to provide a means of causing the selected category stack to stop in the front center of the machine in register with the dispensing slots and the dispensing mechanism. It is a means of electrically indicating to the circuitry the position of the various category stacks. The detailed electrical function of switch 80 will be described in the description of the electrical circuit. It is geared to shaft 78 so that one of its contacts is connected to its slide each time a corresponding category stack is at the front center of the machine. Switch 80 includes stationary contacts portion 320 and pointer 324 shown in FIG. 16 and referred to in the description of the electrical circuit.

FIG. 3 is a sectional side view of the dispensing machine of the present invention. As explained in connection with FIG. 2 housing 10 encloses slide drum 56 movably positioned on shaft 58 supported on member 68. Motor 74 is coupled to speed reducer 76 which drives shaft 78. Rotary switch 80 is shown positioned on bracket 92. Sprocket 82 and sprocket 84 engage suitable means such as a chain which is coupled to sprocket 94 and sprocket 96 positioned on shaft 98 at the opposite end of housing 10 from shaft 78. Sprockets 94 and 96 are suitably positioned on members 100 and 102. Shaft 78 at its upper end is coupled to member 104. Coupled to chains 106 and 108 are category stacks such as stacks 88, 110, 112 and 114. The chains 106, 108 and the drive means therefor constitute a bank conveyor. Each of the stacks includes a group of cards or other items. As mentioned previously rotation of shaft 78 in either direction provides movement to the category stacks such as stacks 88, 110, 112 and 114 and allows proper positioning of such stacks for dispensing of the cards or other items stored in such category stacks.

FIG. 4 is a sectional top view of the dispensing machine of the present invention taken along line 4—4 of FIG. 3. In viewing FIG. 4 it will be apparent that viewing screen 18 is positioned on housing 10. Member 104 extends from one side of housing 10 to the other and acts as a support for the drive mechanism of the category stacks. In FIG. 4 sprocket 84 may be seen. Member 102 extends across the housing 10 at the other end of the housing from member 104. Sprocket 94 is visible in FIG. 4. The location of worm 90 of the card dispensing mechanism may also be seen in FIG. 4. A plurality of category stacks such as stacks 88, 110, 112 and 114 are shown positioned on chain 106. As mentioned previously it will be apparent that chain 106 engages sprocket 94 and sprocket 84 and acts as the upper support for the category stacks 88, 110, 112, and 114. It will be appreciated that the positioning of members 102 and 104 is dependent upon the size of the banks in the category stacks such as stacks 88, 110, 112 and 114 to allow adequate clearance of the banks between housing 10 and the sprockets 84 and 94. Thus, from the figures discussed thus far it will be appreciated that the present invention provides a housing and means disposed within said housing for storing a plurality of items which may be selectively positioned within said housing. Such selective positioning may be achieved through movement of a drive member in either a clockwise or counter clockwise direction.

FIG. 5 is a partial sectional side view of the slide drum control mechanism of the present invention. The slide drum control is part of the viewing system described in connection with FIGS. 1 and 2 and allows advertisement of the cards or other items available in the machine and attracts the attention of prospective customers during the advertising mode. During the select mode and buy modes the viewing device serves to show cards in each category as the customer presses the card select button. During the advertising mode, the viewing device is the only part of the machine operating. If the dispensing machine is not being used for a period of time, an automatic timer switches the machine to the advertising mode in a manner to be explained subsequently in connection with the circuit diagram of the present invention.

The viewing device is similar to a photographic slide viewing device and has been shown and explained in general previously. The slide drum 56 may be multi-sides polygon with as many sides as there are categories. Each side has previsions for mounting the number of slides which are present in each category. In the present explanation 22 categories are shown in FIGS. 1 and 4, so that there are 22 sides on the slide drum. These 22 sides are not detailed in FIG. 5 but are indicated schematically in FIG. 12 and are shown clearly in FIG. 6. As shown in FIGS. 2, 3, and 10, there are six article banks in each category stack so there would be six slides carried by each side of the slide drum in the manner to be explained next in connection with FIG. 6. Slide drum 56 is shown positioned on fixed shaft 58.

FIG. 6 is an end view of the slide drum control mechanism shown in FIG. 5 and shows a plurality of rectangular holes such as 120, 122 and 124 to allow light to pass through the slides. The slides have holes punched in their frames and pins such as 126, 128, 130 and 132 protrude from the drum to provide means of attaching and positioning the slides on the drum 56. Obviously the hole pattern in the slides matches the hole pattern of the pins and allows easy change of slides to correspond to the cards or other items housed in the machine. Of course, other methods of attaching slides may be utilized so long as the projection principal of the advertising mode of the present invention is accomplished.

Referring again to FIG. 5, by means of bearing sleeve 133 and elevator sleeve 134 drum 56 is positioned about and rotatably mounted on shaft 58 coupled to housing 10. Bearing sleeve 133 is secured to drum 56 by bolts 135 and collar 137. Bearing sleeve 133 rests on the upper end of elevator sleeve 134 which projects through collar 137. Sleeve 134 slides up and down shaft 58 but is prevented from rotating by key 136 and keyway 138. A horizontal stepping solenoid 140 is positioned to bracket 142 which is mounted and fixed to sleeve 134. Bracket 142 is positioned on sleeve 134 by screw 144 whereby bracket 142 moves vertically with sleeve 134 but bracket 142 does not rotate.

Slide drum 56 is mounted on the sleeve 134 so that the drum 56 may rotate on sleeve 134. Collar 148 is coupled to sleeve 134 by screw 152. Collar 148 is captured between the lower end of drum 56 and flange 151 on the lower end of bearing sleeve 133. Thus, the slide drum and horizontal stepping solenoid 140 may move vertically together but the slide drum 56 may rotate relative to the horizontal stepping solenoid 140.

Motor 154 provides rotation of pinion 156 coupled to rack 158. The rack 158 is coupled to sleeve 134 whereby rotation of motor 154 provides vertical movement to the slide drum 56.

Rotation of slide drum 56 is provided by the horizontal stepping solenoid 140 pushing pawl 160 against ratchet 162. Upper limit switch 164 is provided along with lower limit switch 166 to indicate the uppermost and lowermost travel of the slide drum 56. Switch 549 and arm 544 also indicate topmost and bottommost travel of the drum 56. As appears in FIG. 15, when drum 56 reaches its topmost position the lower finger of arm 544 moves the single pole double throw switch 549 in one direction where it stays until moved in the other direction by the upper finger of arm 544 when the drum reaches its lowermost position. Switch 549 serves to reverse the motor 156 at either end of the movement of the slide drum 56. Position indicating switches 168, 170 and 172 work with arm 174 to stop the slide drum 56 at various positions. Operation of all switches will be explained in connection with the electrical circuit of the present invention.

As shown in FIG. 2 a light source 54 provides light to shine through the slides whereby the image may be projected on the viewing screen 18. The slight source, lens assembly and viewing screen are stationary to the housing 10 and do not move.

FIG. 6 shows motor 154 and pinion 156 coupled to rack 158 on sleeve 134. Rotary switch 302 is shown in FIG. 6. Its rotary part is driven by drum 56 as described later in connection with FIG. 15. Its non-rotating part, being mounted on elevator sleeve 134, moves up and down with the drum whereby its rotating part can remain coupled to the drum. A rotation detent arm 182 engages notches in the drum 56. Rotation detent 182 is shown in FIG. 7, which is a top view taken along line 7—7 of FIG. 6. Rotation detent arm 182 is shown in engagement with notches 184 on the drum 56.

(2) Operation (a) *Advertising mode.*—During the advertising mode of operation the viewing device projects slides which illustrate available cards or other items housed in the machine. The viewing device shows slides depicting all cards in a category stack starting at the bottom card of the category and progressing upwardly until the uppermost card of the category has been shown. When the drum 56 reaches its uppermost movement, limit switch 549 provides reverse rotation of motor 154 and switch 164 also causes the horizontal stepping solenoid 140 to rotate the drum one position which provides another category. Since the motor 154 has reversed rotation the drum 56 moves downwardly in steps controlled by a timer and when the drum 56 reaches the bottom of its travel lower limit switch 166 is actuated thereby causing horizontal stepping solenoid 140 to rotate the drum 56 to another category while switch 549 reverses the direction of rotation of the motor 154. Drum 56 then begins to move upwardly in steps.

(b) *Select mode.*—When a customer presses a category selector switch, the electrical circuit of the present invention causes the horizontal stepping solenoid 140 to rotate the drum 56 to a position so that slides depicting the cards in the particular category stack will be shown on the viewing screen. The electrical circuit causes motor 154 to lower drum 56 to its lowest position in order to project a slide on the viewing screen depicting the card in the lowest bank in that particular category stack. When the customer presses the card selector button, the electrical circuit causes the drum to raise one frame to the next card and a photograph of such next card is viewed. At the same time the dispensing mechanism of the machine of the present invention is operating and moves to a position to allow ready dispensing of the card shown on the viewing screen. It is to be noted that upward travel of the drum positions successively lower slides in front of the viewing screen, but if the slides are in inverse vertical order to the cards in a particular stack of banks, as the drum moves up the slides projected on the viewing screen will correspond to the cards in successively higher banks in a particular stack. On the other hand if the slides are in the same vertical order as the cards, then as the drum moves down, the slides projected on the viewing screen will also correspond to cards in successively higher banks.

FIG. 8 is a perspective view in detail showing one of the card banks 86 which store a supply of elongated substantially flat objects such as cards. The category stacks store all cards of a similar category such as birthday cards, sympathy cards, or anniversary cards in individual vertical banks. All the cards in a particular bank are identical. The physical construction of a card bank as shown in FIG. 8 obviously is not limited to this particular type of construction. In FIG. 8, however, the card bank comprises two continuous strips 185, 187 provided with notches such as 186 and 188, 192 and 194. A storage plate 190 may be positioned within the individual notches to hold an elongated item such as a card 196 which may be in an envelope. Thus, if there are 3,000 cards available for vending in the machine then 3,000 storage plates similar to plate 190 would be provided. With 22 stacks and 6 banks per stack, as shown, 25 plates in each of the 132 banks would handle 3300 cards. Plate 190 is slidably mounted in the grooves or notches but is mounted tight enough so that the plate will not move under normal operation of the machine but only by the pusher arm 234.

The card storage plate with a card positioned therein is shown in perspective view in FIG. 9 but the configuration shown in FIG. 9 obviously is merely an example and any suitable configuration may be utilized. In the configuration shown in FIG. 9, however, the card storage plate 190 may be stamped from sheet metal. A base 200 is provided for supporting the card 196. Spring clamp 202 and another spring clamp 204 are coupled to the base 200 to retain the card 196 positioned on base 200. The width of the spring clamps 202 and 204 may be wide enough to allow any width of card to be positioned on the storage plate 190. A vertical protrusion 206 may be stamped from the base 200 of storage plate 190 to provide a positive pushing means for the card 196. A vertical protrusion 210 is provided to allow pusher arm 234 shown in FIG. 8 to push the card storage plate 190 and the card 196 forward to eject the card through the delivery slots previously shown and explained. Protrusion 210 provides a firm surface for pusher arm 234 to contact and the protrusion extends high enough to allow for manufacturing tolerances which must be reconciled. A stop 212 is shown in FIG. 9 to limit the travel of the storage plate as it is loaded with a new card. The stop 212 is bent in place during assembly after being stamped in the blanking operation of manufacture of the storage plate 190.

Referring again to FIG. 8 a switch 214 is shown for engagement with protrusion 210 of the storage plate 190. The card bank shown is the uppermost in its stack. Chain 106 is shown coupled to the category stack between guides 216 and 218.

FIG. 10 is a side view showing the card dispensing mechanism of the present invention. Worm 90 is shown positioned within housing 10. The dispensing mechanism shown in FIG. 10 is located behind the category stacks and is in vertical alignment and parallel to the row of delivery slots. The dispensing mechanism is coupled to the housing 10 by a vertical worm 90 and a smooth fixed guide shaft 220. An electric motor and speed reducer 222 provide means for rotating the worm 90. Platform 224 is coupled to worm 90 by a nut 226 which is part of platform 224. As worm 90 rotates, platform 224 is either raised or lowered depending on the direction of rotation of the motor 222. Platform 224 is prevented from rotating by being slidably attached to the fixed shaft 220 through a bearing 228. Worm 90 is mounted to housing 10 by a bearing 230 at the upper part of housing 10. Pusher assembly 232 includes an arm 234 and motor 254. The pusher assembly 232 moves in a vertical direction relative to platform 224. Pusher assembly 232 is coupled to the platform 224 through a worm 238 and shaft 240 which is not shown in FIG. 10 but which is shown in FIG. 11.

FIG. 11 is an elevational view showing a side view of the card dispensing mechanism in detail. In FIG. 11 shaft 220 is shown having a platform 224 coupled thereto. Worm 90 is positioned through platform 224. Pusher arm 234 is shown positioned on the pusher assembly 232. Worm 238 extends through platform 224 but is not connected to platform 224. Platform 242 provides a base for the pusher assembly 232. Base 242 is connected to the worm 238 through a nut 244 which is part of the base 242 and through a sliding bearing 246 to shaft 240.

As motor 236 rotates worm 238 is turned and causes the pusher assembly 232 to move up or down depending on the rotation of motor 236. Pusher assembly 232 is prevented from turning by the shaft 240. Pusher arm 234 is mounted to the base 242 through a sliding dovetailed guide 248. Pusher arm 234 thus may move in a horizontal direction from a fully retracted position to a position such that the lever of switch 250 may contact plate 190. Pusher arm 234 is moved horizontally by rotation of motor 254 which turns a pinion 256 coupled to a rack 258. Motor 254 is mounted to base 242 and rack 258 is the rear portion of the pusher arm 234. Direction of movement of pusher arm 234 is determined by the direction of the rotation of the motor 254. A solenoid 260 is positioned on the upper portion of dispensing slots 52 of the machine and the function of solenoid 260 will be explained in detail subsequently. Upper chain 106 is shown in FIG. 11. A card 196 is shown extending through dispensing slots 52 in FIG. 11. The holder of the card 196 is shown in the position wherein the card holder has moved to dispense the card 196. Plate 190 in FIG. 11 shows the card holder in a position ready for pushing the card through the dispensing slots 52 upon actuation by pusher arm 234.

Thus, the operation of the dispensing mechanism portion of the selecting machine of the present invention is as follows:

A customer has pressed a category button and the electrical circuit of the dispensing machine of the present invention has caused the proper selected category stack to move between the delivery slots and the dispensing mechanism as pointed out previously description of the electrical circuit will be explained later. The electrical circuit has caused the pusher assembly to be in its lowest position on the dispensing mechanism and the dispensing mechanism to be at its lowest position whereby the pusher arm could push out the lowest card in that category stack. Each time the customer presses the card selector button the dispensing mechanism moves to a position that places the pusher arm in position to push out the lowest card in the particular card bank. As explained previously, visual presentation of this card is simultaneously being projected on the viewing screen. Each time the customer presses the card selector button the pusher assembly is raised to the lowest card in the next bank of cards in a category.

The action described above continues each time the customer presses the card select button 22 until the dispensing assembly has reached the lowest card in the top bank of cards. If a customer wants to see a card that he has viewed previously, he can reverse the movement of the slide drum by pressing the button 22 in the opposite direction. When the mechanism has reached the lowest card in the top bank in the stack a note is projected on the viewing screen telling the customer that he has viewed all cards in this category and that he can review the cards in this category by pressing the button 22 in the opposite direction or view other categories by pressing a different category switch. This phase of the operation of the machine is described in more detail hereinafter in connection with the electrical circuit shown in FIGS. 15 and 16.

(c) *Buying Mode.*—If the customer decides to purchase a card he places the correct coins in the coin slot. The electrical circuit causes the motor 254 to turn which moves the pusher arm 234 to a position where switch 250 can contact the bottom one of the storage plates that are still rearward (their cards have not been sold). There is a space between card banks so the arm 234 may go under the lowest card in a bank. At the same time the action of switch 262, actuated by cam 264 as pusher arm 234 moves forward, causes motor 236 to rotate worm 238 to cause the pusher assembly to rise. The pusher assembly rises until the lever of switch 250 contacts a plate which has not been pushed forward thereby indicating that its card has not been sold. When switch 250 contacts a plate which has not been pushed forward, the action of switch 250 causes motor 254 to rotate to push the pusher arm 234 forward again. As arm 234 moves forward, storage plate 190 moves to deliver a portion of the card through the slots of the dispensing slots 52. At the same time the electrical circuit causes solenoid 260 to be energized so the hinged flaps 546 will move to a position to allow a card to pass through such flaps. Forward motion of the pusher arm 234 is stopped when switch 266 is contacted by pin 268. Switch 266 causes motor 254 to stop rotating. If a particular card in a bank is sold out, the dispensing mechanism will not stop at this card, and the slide drum will not stop to show a photograph of this card. This is accomplished as follows: One of a group 135 (see FIG. 16) of switches, of which switch 214 is a member, is positioned at the rear of the top card (the last to be sold) in each card bank. When this card is sold, the plate is moved away from the switch. This action provides a means for the electrical circuit to prevent the dispensing mechanism to stop at this bank and prevents the slide drum from stopping to project a picture of this card. This action will be explained subsequently in detail in the electrical description. The dispensing mechanism will remain in the position just described until the card select button or a category select button is pressed or more money is inserted in the coin mechanism. Any of these events will cause the motor 254 to rotate to move the pusher arm 234 to the position wherein arm 234 is ready to repeat the dispensing operation. When pin 268 contacts the lever of switch 270 the pusher arm 234 is stopped. Switch 270 also causes motor 236 to rotate to lower the pusher assembly to its lowest position. Switch 272 stops motor 236 when the base 242 has reached its lowest position and the action is ready to start again. If the customer inserts proper coins again the process will repeat and another card identical to the one that the customer has just purchased will be vended by the machine.

FIG. 12 is a perspective top view showing the slide drum of the present invention. Drum 56 is positioned on shaft 58. The drum 56 is a multi-sided polygon with as many sides as there are categories. Twenty-two categories are shown for illustration. Each side has provisions for mounting the number of slides that are in each category. FIG. 12 shows six positions in the column indicated as 56A.

Electric circuit: select mode (a) *Category switches.*— FIGS. 13, 14, 15 and 16 show various individual portions which provide the entire electrical control circuit utilized in the dispensing machine of the present invention. The purpose of the control circuit is to energize the various motors and switches and solenoids so that all parts of the dispensing machine of the present invention are timed together to operate as required in the various modes. The electrical circuit may be explained best by outlining the operation of such circuit in the various modes. The select mode will be explained first. To select a card or other items stored in the dispensing machine of the present invention the customer first presses a category switch button such as those buttons identified as 24, 26 and 28 in FIG. 1. There are as many category buttons as there are categories but only three switches are shown FIG. 15 for illustration. The selector switches buttons 24, 26 and 28 are shown in FIG. 15 coupled to switches 280, 282 and 284 respectively. Only switch 280 is shown wired completely but all category switches are wired identically. All switches have holding relays like relay 290 in their lines to rotary switch 302. These are represented by the boxes 501 and 502 for switches 26 and 28. The switches may be of the double pole momentary contact type normally open. When a customer presses a category button such as button 24 the related category switch is actuated to make contact momentarily. Switch 280 operated by button 24 will be used as an example in explaining the operation of the dispensing machine of the present invention.

When switch 280 is actuated pole 504 is closed which energizes relay 298. When relay 298 is energized normally closed contact 503 opens. Opening of contact 503 removes power from line 505 and all holding circuits, such as contacts 292 of relay 290, are broken. This causes the relay (corresponding to relay 290) energized by the previously actuated category switch to drop out. This prepares the machine for motion to the next category which occurs when the customer releases the button for switch 280. Switch 280 is of the type that one contact breaks before the other as the button is released. Contact 504 breaks before 286 so that relay 298 is deenergized and contact is made to 503 before contact 286 is broken. Thus, when the button for switch 280 is released, relay 290 is energized through contacts 286. When relay 290 picks up, holding contacts 292 are closed which keep relay 290 energized after contact 286 opens when the button for switch 280 is fully released. With relay 290 picked up, power can be fed through 503, 292, and 294 to line 300. Thus line 300 and contact 306 of rotary switch 302 receive power through contact 294. The customer only needs to press the button momentarily and release it. This will require only a fraction of a second. The power thereby supplied to the line 300 energizes rotary switch contact 306 corresponding to the select category. As will next be explained, the drum 56, which was already rotating step by step in the advertising mode, continues to rotate until it drives pointer 304 of rotary switch 302 into engagement with the contact 306. This energizes circuitry to cause bank conveyor motor 74 to move the conveyor until the selected stack is opposite the card delivery slots 52.

(b) *Drum rotation.*—During the advertising mode the horizontal stepping solenoid 140 rotates the slide drum step by step at about one-half second intervals. The location and configuration of horizontal stepping solenoid 140 and ratchet 162 shown in FIG. 5 has been explained previously. Horizontal stepping solenoid 140 receives its power through a timer 506, line 412 and relay 476. When solenoid 140 receives power its plunger moves forward to push the ratchet one space. When power is released the plunger returns by spring action. Timer 506 is connected in the circuit so that smooth action will be made by allowing the plunger to move only about two times per second so the solenoid will not have an action like a jack-hammer. The timer is a purchased item and is not part of the present invention. Its detailed operation will not be explained since such operation is well known in the art. The timer is of the type that when power is applied to it at terminals 507 and 508, contact will be made to terminal 509 to complete the circuit to solenoid 140. When power is applied to terminals 507 and 508, the timer makes contact between terminals 507 and 509 and then breaks contact after a small interval of time has elapsed. When contact is broken to terminal 509, the plunger returns by spring action. This action will continue until power is removed from terminal 507 and the slide drum moves about two spaces per second continuously as long as relay 476 is deenergized. Relay 476 is inserted in line 412 to cause this action to stop when relay 476 is energized. Relay 476 receives power to its coil through relays 310 and 480. The purpose of relay 480 will be explained later in the description of the advertising mode. For the present, assume contact 510 of relay 480 is closed so power is fed to contact 312. The slide drum will be rotated step by step until relay 476 is energized to break contact 478, as explained hereinafter.

Pointer 304 rotates with the slide drum 56 positioned on shaft 58 since pointer 304 is connected to the slide drum 56. When pointer 304 rotates enough to make contact with contact 306, power is passed through the line 308 to cause actuation of relay 310. Contact 312 is closed thereby energizing line 316, and also line 511. When line 316 is energized, relay 476 opens and breaks contact 478, thereby causing the stepping solenoid to stop and it will stop at a definite position determined by the location of contact 306. This position will be in alignment with the light source and the lens assembly in the center portion of the dispensing machine so that slides of cards available in the selected category will be shown on the screen. Thus, by pressing button 24, the viewing device rotates and then stops in a position such that cards available in the selected category will be projected on the screen.

(c) *Bank conveyor drive.*—Main drive motor 74 shown in FIG. 16 receives power from line 511 off of contact 312 of relay 310. It is fed through contact 328 and switches 464 and 466. Action of these switches and relays will be explained subsequently. When relay 310 closes and line 511 is energized main drive motor 74 receives power and begins rotation to move the category stacks in a horizontal direction. Contact 328 of relay 326 is in line 511 so that the motor 74 will run as long as relay 326 is closed. Relay 326 serves to stop the motor at the proper time so that the selected category stack is in register with the dispensing mechanism and delivery slots. This will now be explained.

The contacts on the stationary parts of switches 302 shown in FIG. 15 and switch 80 shown in FIG. 16 are wired together. For example, contact 306 is connected to contact 322 and other contacts shown in switch 302 are connected to corresponding contacts on switch 80. The pointer 324 on switch 80 is connected to bank conveyor shaft 78 so that the pointer moves from one contact to the next as one category bank moves the distance between the centers of two category banks. Relay 326 is normally closed so motor 74 shown in FIG. 16 runs when line 511 is energized and the coil in relay 326 is not energized. The coil for relay 326 receives its energizing power from pointer 324 of the switch 80. Pointer 324 is rigidly attached to 78 and the stationary part 320 holding the contacts is stationary to the housing 10. The conveyor and category stacks move when motor 74 is energized and the category stacks will move until pointer 324 has contacted the contact that is energized through switch 302 shown in FIG. 15. At this time the coil of relay 326 shown in FIG. 16 will become energized and open contact 328 which causes power to be removed from the motor 74. Thus, the conveyor and the category stacks are stopped so that the selected category stack is in alignment with the dispensing mechanism and in alignment with the delivery slots. The proper category is in position to dispense a card and the slide is in the proper position to project slides of this category on the viewing screen.

(d) *Slide drum automatic lowering.*—When any category selector button and switch such as 24, 26 or 28 as shown in FIG. 1 is operated, the slide drum 56 shown in FIGS. 15 and 16 is moved down to show a picture of the lowest card stored in the selected category and the dispensing mechanism is moved to its lowest position and this operation will now be explained.

Referring to FIG. 15, when any category switch such as switch 24, 26 or 28 is actuated, relay 298 momentarily breaks the circuit to all holding coils in all category holding relays such as 290 shown in FIG. 15. Relay 298 also has a normally open contact 392 so that power is momentarily supplied to line 394 at the same time that circuits are broken to the holding coils of other categories.

Referring to FIG. 14, line 394 on FIG. 15 is picked up in FIG. 14 in the upper left-hand portion showing relays 432, 438 and 440 which will be explained in detail subsequently. Line 394 also is continued in FIG. 16 in the lower left hand corner and connects to relay 296. Relay 396 is provided in the circuit to operate just as if someone held switch 22 in the down position and its operation will be explained later. Switch 22 provides means to allow a customer to raise or lower the slide down to view different cards. Relay 396 is a three-pole relay with two normally open contacts and one normally closed contact.

When power is fed to the coil of relay 396 through line 394 shown in FIG. 16, normally closed contact 398 opens and disconnects power to switch 22 so that a customer cannot move the slide drum until such slide drum has reached its lowest position. Contact 400 on relay 396 supplies power through lead 402 to contact 404 and the coil of relay 340 so the circuit will operate as if the customer has moved switch 22 to the down position. Contact 406 supplies power to the coil of relay 396 and holds it there until switch 408 breaks the circuit feeding power to relay 396.

Switch 408 is actually a second contact on switch 164 shown in FIG. 5 and is normally closed. When the drum 56 reaches its lowest position, switch 408 is opened to release relay 396 and control is given back to switch 22 so the customer can select the card he desires to purchase.

(e) *Slide drum manual raising and lowering: card selector switch.*—The customer can now select and buy a card in the selected category. The customer can view the various cards in the category one at a time by operating switch 22 shown in FIG. 1. As was described previously, vertical movement of the slide drum 56 is achieved by the rotation of motor 154. As shown in FIG. 16 motor 154 for causing movement of the drum 56 receives power through line 330, and either relay 340 or 338 depending on whether movement is up or down. Switch 22 it will be remembered is the selector switch shown in FIG. 1 as well as in FIG. 16. When switch 22 is in the position to energize relay 338 it energizes line 332 and the motor 154 will move the slide drum 56 upwardly. When switch 22 energizes relay 340 which in turn causes line 334 to be energized the slide drum 56 moves downwardly. Line 330 receives power from line cord 297 shown in FIG. 15. Switch 22 receives its power through relay 396 and contact 398 and line 511 which is energized by relay 310 in the select mode after the drum has reached its proper category. Thus, a customer cannot move the slide drum 56 during the advertising mode but switch 22 controls the vertical movement of the slide drum in the select mode. Vertical movement of the slide drum is stopped at each slide frame as described hereinafter.

The group 610 of vertical sensing switches identified individually as 168, 170 and 172 in FIG. 5 are fixed relative to the housing 14. These switches are connected in series so that all must be closed to allow the slide drum to move. The switches are normally closed and are opened only when the switch operator 174 shown in FIG. 5 engages the switches. Power to the motor 154 must be received through relays 338 or 340 for the motor 154 to be energized. Switches such as switches 168 are mounted in series in line 346 so that power is disconnected from the motor 154 any time one of the switches such as switch 168 is contacted by the operator arm 174 shown in FIG. 5.

Relays 340 and 338 provide a means for switch 22 which is operated by the customer to route power and to hold such power on either line 332 or line 334. When relay 338 is energized line 332 is energized through line 348 so that motor 154 rotates to raise drum 56 upwardly. When relay 340 is energized power is routed to line 334 through lead 350 to cause motor 154 to rotate in the opposite direction thereby lowering the slide drum 56.

When switch 22 is operated so its pointer 118 is moved to contact 539 power is applied to the coil of relay 338 through lead 352. Contacts 354 and 356 close. Relay 338 is double-poled and since line 358 is connected to line 352 contact 356 will hold power to the coil through lines 358, 360 and 346 even though the switch 22 is released. As the customer actuates the button power is fed through the group of switches 610 through 360 to line 332 through lead 348 thereby causing motor 154 to move the slide drum 56 upwardly. The slide drum 56 will continue to move up until power is removed from the coil of relay 338. At this time power to the coil of relay 338 is being supplied through lines 346, through line 360, through contact 356 and through lead 358 to coil of relay 338. As slide drum 56 moves, one of the switches such as 168 will be actuated by the operator 174 and the circuit to the coil of relay 338 will open so that the slide drum 56 will stop again. Drum 56 may be moved downwardly in a similar manner except that relay 340 routes power to the motor 154 to cause it to rotate in the opposite direction thereby lowering the drum 56.

Each time one of the switches such as switch 168 is actuated by the operator 174 the drum 56 stops movement so each time switch 22 is operated, drum 56 will move vertically one frame depending on the operation just described.

(f) *Dispense vertical motion.*—The dispensing mechanism of the present invention follows the slide drum 56 so that such dispensing mechanism will be in the correct vertical position to dispense a card of the type which the customer views on the viewing screen. The operation of the dispensing mechanism of the present invention will be described next.

Rotary switch 362 shown in FIG. 16 is geared through a speed reducer and angle drive 364 also shown in FIG. 10 to worm shaft 90 in such a ratio that it provides a means of stopping the dispensing mechanism in the correct vertical position to be behind the lowest card in the supply of a particular card in a card bank that is being viewed on the screen. Each time the pointer 366 of switch 362 contacts one of the contacts shown on switch 362, pointer 366 moves the space between one contact and the next contact and at the same time, the dispensing mechanism moves from the lowest card of a bank to the lowest card of the next bank. The positioning of the various banks may be seen in FIG. 2. Motor 154 moves the slide drum 56 slightly faster than motor 222 moves the dispensing mechanism. The motor 22 is supplied with power through lines 368 and 370. Line 368 is coupled to line 332 and line 370 is coupled to line 334 of the motor 154 through relays 374 and 533. Motor 154 moves the slide drum 56 as explained previously. Motor 222 is wired so that it causes the dispensing mechanism to move up when power is received from line 368 and the dispensing mechanism moves down when power is received by motor 222 from line 370.

The contacts on switch 362 are electrically connected together. Pointer 366 receives power through line 372. Line 372 may be coupled through switches 468 and 470 to a power cord from which the entire system receives power. Relay 374 is connected in lines 368 and 370. The coil of relay 374 receives power through rotary switch 362 and line 372. As the pointer 366 rotates and makes contact with one of the contacts on switch 362 power is fed to the coil of relay 374 through lead 376. Relay 374 is a normally closed relay so that when the relay 374 is actuated power to the motor 222 is disconnected and the motor 222 stops rotating. Since each contact of the switch 362 corresponds to a position of the dispensing mechanism where it is ready to push out the lowest card in a card bank, the dispensing mechanism will be in the correct position to dispense a card shown on the viewing screen.

(g) *Sold out by-pass.*—A group of switches 135 (see FIG. 16, upper left) such as 214 in FIG. 8 are located in a vertical alignment near the center of the dispensing machine so that the top storage plate of each card bank in the category, in the position to be dispensed, holds the switch in the closed position. If the last card in the bank (the topmost card) has been dispensed, the storage plate will have been pushed forward and the switch will have been released to close the contact. For each switch in group 610 (see FIG. 16, upper left) there is a corresponding switch in the group 135. There is a switch such as 214 in group 135 wired in parallel to each of the switches in group 610. Corresponding switches in groups 135 and 610 are connected in parallel. Group 610 is located at the slide drum mechanism and operated by 174 like 168, 170, and 172 in FIG. 5. Group 135 is located like 214 in FIG. 8.

If all cards of a group are sold out the switch in group 135 will be closed and even through the operator 174 causes the switch in group 610 to open, the switch in group 135 will still maintain contact. This causes the slide drum 56 to pass up and not to stop at a group of cards that have been sold out because contact in line 346 has not been broken.

(h) *Blackout plate.*—As shown in FIG. 2 a blackout plate 62 is located between the slide drum 56 and the lens 60 to block out the viewing screen 18 at any time that the slide drum 56 is moving or when all cards in a particular card group have been sold out. Solenoid 64 causes the plate to move in front of the lens when solenoid 64 is energized. The blackout plate 62 is shown coupled to solenoid 64 in FIG. 16. Line 380 or line 382 is energized any time the slide drum 56 moves either up or down. Isolating relays 380 and 382 are provided to feed power to the solenoid 64 any time that lines 384 or 386 are energized. When either relay 384 is energized to allow closing of contact 388, or when relay 386 is energized to allow closing of contact 390, power is provided to solenoid 64 from line 513 shown in FIG. 16 which is always energized inasmuch as line 513 as explained previously is part of the power supplied by a conventional power cord coupled to an alternating current system. Since either line 380 or 382 is energized any time slide drum 56 is moving, the blackout plate will be in position to block the view on the viewing screen whenever the drum is moving one slide out from behind the screen and positioning another in its place. Only stationary slides will be projected on the screen. Since the drum does not stop opposite slides coresponding to sold out cads, this action prevents the machine from displaying a card that is not available.

Electric circuit: buying mode

Now the customer has found a card or other item in the dispensing machine of the present invention and is ready to purchase such card or other item, the buy mode of operation of the electrical circuit will be described. The buy mode operates when correct coins are inserted in a coin slot. In the select mode, the customer has chosen the card he desires to buy and the dispensing mechanism has positioned itself to dispense the lowest card positioned in the selected card group. It will be recalled from FIG. 11 that the pusher arm 234 is in its most extreme rearward position at the beginning of the dispensing operation of the buy mode unless a card has just been purchased and no controls have been operated. This is referred to as the starting position to be described later. Referring to FIG. 14, in the buy mode, power is delivered to the motors 254 and 236 of the dispensing mechanism through relay 410. Relay 410 is coupled through lead 548 to lead 548 shown in FIG. 13. Relay 410 is controlled by rotary switch 414 shown in FIG. 13. A patch panel 416 and another patch panel 418 are provided as shown in FIG. 13. The coin mechanism 420 is coupled to the patch panels 416 and 418. The coin mechanism and the related circuits just described provide a means of causing the dispensing mechanism of the present machine to deliver a card only when proper coins are inserted and also provides a means for the service or maintenance man to adjust prices of cards of various categories and card groups. Rotary switch 414 provides a means of indicating which category is in position for delivery. Rotary switches are well known in the electrical circuit art and a detailed explanation of such rotary switch is not thought to be necessary. The patch panels 416 and 418 provide a means of adjusting the prices of a particular card group.

The electrical circuit for providing a means of setting the price of a particular card group and allowing the machine to only deliver the card when correct coins are inserted in the coin slot is shown in FIG. 13.

Only two category banks have been shown as examples. Rotary switch 414 shown in FIG. 13 is connected to a conveyor shaft in a manner similar to the switches previously described. A pointer 420 shown in the upper left-hand portion of FIG. 13 is connected to a conveyor shaft and rotates with the shaft. Pointer 420 is energized only in the select and buy modes through line 511 shown in FIG. 15. There is a contact on rotary switch 414 for each category such as categories A, B, C, and D as indicated in FIG. 13. Power is delivered only when the corresponding category is in position in front of the disepnsing mechanism and the delivery slots. A contact is provided on rotary switch 414 for each category and a patch panel such as 416 and 418 is provided for each category. There are as many poles 422 on the patch panel as there are card banks in the category. Only six card banks are shown in FIG. 13. All of the poles 422 are connected together so that they are all energized when the pointer 420 contacts the contact which corresponds to the related category. Patch panel 416 is for category A while patch panel 418 is for category B. It will be obvious and apparent to those skilled in the art that other series of poles are provided such as poles 424 and 426 for each priced card. Each patch panel thus includes a base pole, such as 422, all of whose contacts are connected to the same category contact, such as contact A, of rotary switch 414, and a plurality of price group poles, such as 424, 426, each contact of the base pole also being connected to a contact of one of the price poles.

As shown in FIG. 13 card $A_1$ would be a 25¢ card since it is on patch panel A and pole number one and connected to the 25¢ series of poles. Card $A_3$ would be a 50¢ card as shown since it is connected to a 50¢ pole. As will be described later, pusher arm 234 will be fully rearward and platform 232 will be at the bottom of its travel at the start of the buy mode.

The coin mechanism 420 closes contacts 428 and 430 when the related proper denomination of coins are inserted, contact 428 only closes when a 25¢ coin is inserted and contact 430 only closes when a 50¢ coin is inserted. The circuit through line 548 shown in FIG. 13 energizes relay 410 shown in FIG. 14 and the dispensing mechanism shown in FIG. 14 will begin to operate. The coin mechanism is a standard item of the type that will maintain contact through 428 or 430 when coins are inserted until a circuit is completed between terminals 522 and 523. Relay 410 shown in FIG. 14 is a double-pole relay. Power is supplied to contact 520 through line cord 513 and lead 456. Contact 521 is made to the line cord 513 any time relay 444 is deenergized. It will be deenergized because insertion of coins or operating the category or selector switches causes the dispensing mechanism to move to its starting position as will be explained later. Contact 519, connected to contact 521, holds power to the coil 410 until the buying mode operation is completed. This is accomplished as follows: When coins are inserted, the coin mechanism holds power on line 548 until the pusher arm has gone forward to deliver the card. At this time contact 526 closes as switch 266 is operated by pin 268. When 526 closes, contact is made through 524 and 525 and the coin mechanism breaks contacts 428 and 430 shown in FIG. 13 and causes relay 410 to close. When relay 410 closes, power is supplied to motor 254 through contact 515 to cause motor 254 to rotate in the direction to move the pusher arm 234 shown in FIG. 11 forward to the intermediate position. The intermediate position is a position between the most rearward position of the arm and the most forward position of the arm. The pusher arm 234 is shown in FIG. 14 also.

When the arm is in this position, switch 250 is in position to contact the bottom of the next plate upward that has not had its card sold of the assembly shown in FIG. 11 thereby providing a means of arm being positioned to deliver a card which has not been sold.

When the arm 234 reaches its intermediate position pin 264 contacts switch 262 and opens contact 515 on switch 262. Since contact 515 is in series with the motor 254, the motor stops and the arm 234 stops in its intermediate position. At the same time a normally open contact 516 on switch 262 closes the circuit to motor 236 through normally closed contact 517 on switch 250 and the motor 236 begins rotation to raise the platform 232 shown in FIG. 11. The platform 232 shown in FIG. 11 is raised by motor 236 shown in both FIG. 11 and in FIG. 14 until the lever of switch 250 contacts a plate that is still in its rearward position indicating that this plate carries the next card in the group that has not been sold. In other words, the platform moves upwardly until a plate is reached whereon a card is positioned awaiting delivery through the delivery slots. Thus, when switch 250 is operated by touching the bottom of the plate, the circuit to motor 236 is broken at contact 517 and the upward movement to platform 232 stops. Thus, the position of the platform and the arm has assumed a position wherein the uppermost unsold tray has been engaged by the arm. The normally open contact 518 on switch 250 also closes at this time and completes the circuit to the motor 254 through normally closed switch 266 to rotate the motor 254 in the direction to cause the pusher arm to push the card storage plate forward and push the card out of the delivery slot so that the customer may take it. The arm's forward motion is stopped when pin 268 actuates switch 266 to open switch 266. When coins are inserted solenoid 260 is energized to open the flap over delivery slots. The customer can now grasp the card and remove it from the delivery slot. The dispensing mechanism will remain in this position until one of the three following events takes place:

(a) more money of correct denomination is inserted into the coin slot which will start the process again;
(b) the customer presses another category button; or
(c) the customer moves the card select switch.

Under any of these three conditions, the pusher arm will return to its rearward position and the platform 232 will lower to its lowest position. This position may be referred to as the starting position. This is a position where the select or buy mode may start with no damage to the machine.

The starting position is obtained as follows: When any of the lines 394, 434, or 436 shown in FIG. 14 is energized, one of the isolating relays such as relays 432, 438 or 440 will be closed and power will be delivered to line 442 shown in FIG. 14. Power is delivered to 394 from relay 298 when any category switch is pressed. Power is delivered to 436 when the card selector switch is operated. Power is delivered to 434 when coins are inserted in the coin mechanism. Power from line 442 energizes relay 444 and its holding contact 446 will remain closed until its circuit through contacts 448 and 450 both are broken. Contact 448 is part of switch 270 at the rear of the pusher arm and contact 450 is part of switch 272 on the platform shown in FIG. 12. Relay 444 also has a contact 452. Contact 452 is made with line 454 when relay 444 is energized.

Power is fed through contact 458 which is part of switch 270 (270 is a rearward limit switch located on 242 in FIG. 12) thereby causing motor 254 to move the arm rearwardly. The arm moves to the rear until contact 458 on switch 270 is opened as switch 270 is actuated when the arm reaches its rearward position. When contact 458 opens, motor 254 stops. At this time contact 448 on switch 270 at rear opens and contact 462 closes. When contact 462 closes, motor 236 rotates in a direction to lower platform 232 and the pusher arm 234. The platform and arm are lowered until they contact switch 272 and the contact 460 is opened to cause motor 236 to stop. At this time contact 450 on switch 272 opens and relay 444 is returned to normal. Contacts 448 and 450 are wired in parallel so both must be opened to release relay 444. Thus, the arm must be full rearward and the platform 232 down in order to return the circuit to normal. Contact 462 is provided so the platform will not move down until the arm is all the way back thereby preventing damage to the storage plates and the arm. Contacts 464 and 466 shown in FIG. 16 are contacts on switch 270 and on switch 272. Switches 464 and 466 are provided to prevent movement of the main conveyor motor 74 shown in FIG. 16 until the arm is at the starting position. Contact 468 and contact 470 are shown in FIG. 16 coupled to line 372 and to line 161. Contact 468 on switch 270 and contact 470 on switch 272 prevent motor 222 from rotating until the arm is at the starting position thereby preventing damage to the dispensing mechanism and to the machine.

Electric circuit: advertising mode

The advertising mode now will be explained. As mentioned previously if the machine of the present invention has not been operated by a customer for a predetermined and adjustable length of time, a timer 527 switches the machine to the advertising mode. In the advertising mode the machine displays photographs of cards or other items available in the machine on the viewing screen one at a time. The timer 527 may be purchased and is of a conventional design the internal operation of which will not be discussed or described inasmuch as such timers are well known in the art. The timer is of the type that starts a timing period when a signal is applied between two of its contacts 530 and 531. The timer operates until the set time has elapsed. At this time it makes contact between 528 and 532 and breaks contact between 529 and 532. Power to the main drive motor 74 and the dispensing mechanism vertical movement motor 222 is disconnected in the following manner: When the machine has not been operated by a customer for a length of time set on timer 527, contact will be made between 532 and 528 and power will be supplied to normally closed relay 480 causing contact 510 to open. Power to the main drive motor is received through contact 510 and contact 312 of relay 310 and line 511. When relay 480 opens, power is no longer available to motor 74 so in the advertising mode the conveyor will not move. Power is supplied to the dispensing mechanism vertical movement motor 222 through normally closed relay 533 shown in FIG. 16. Line 534 is connected to contact 528 of timer 527. When the advertising timer 527 makes contacts 528 and 532, the dispensing mechanism will not move up or down since normally closed relay 533 opens contacts 600 and 535.

In the advertising mode, the viewing device projects a photograph of each card available one at a time on the viewing screen for a short period of time. The time may be adjusted and is controlled by view time 536 (FIG. 16, lower right). The slide drum moves up a slide column corresponding to a category stack in steps, showing photographs of each card, each step, and when it has reached the top of its travel it moves to the next category and moves down in steps. The operation continues as long as the machine is in the advertising mode and is accomplished in the following manner: The action of the circuitry to move the slide drum up and down has been described. It will be recalled that operation of switch 22 by the customer causes the drum to move either up or down as shown in FIG. 16. Relays 537 and 538 are supplied to apply power to either contact 539 or 404 respectively just as if the customer had moved switch 22. When relay 537 is closed the slide drum will move down one frame; when relay 538 is energized, the slide drum will move up one frame. Timer 536 is provided to set and adjust the time that the picture of each card remains on the screen. Timer 536 receives power from contact 528 shown in FIG. 15 through line 541 so it goes into operation when the advertising timer 527 closes contact 532 to 528. Timer 536 is of the type well known in the electrical art that closes contact 540 when power is supplied to terminal 541 and leaves 540 closed until the set time on it runs out. At this time, it breaks contact 540 and starts its timing period over. As explained previously only momentary contact of switch 22 is required to move the slide drum one frame. Thus, the slide drum only moves one frame each time the timer closes contact 540.

When the slide drum reaches either the top or bottom of its travel, it rotates one category, and starts moving in the opposite vertical direction. Action of limit switch 549 at the top and bottom of the slide drum travel has been discussed previously in connection with FIG. 5. When the slide drum reaches the top of its travel, switch 549 is closed to contact 545 as the bracket 544 causes closing. When the drum reaches the bottom of its travel, switch 549 is closed to 546. Power is fed to 549 from contact 528 so it only receives power in the advertising mode. When the drum reaches the top of its travel and 549 is closed to 545, power is applied to relay 537 shown in FIG. 16 through line 542, and relay 537 closes to cause the drum to move downward in steps. When the drum reaches the bottom, 549 closes to 546, relay 538 closes and the drum moves up in steps. When the drum reaches the top or bottom of its travel, it rotates one category. The action of the horizontal stepping solenoid 472 and timer 506 has been explained in conjunction with the Select Mode. Timer 506 is of the type that when a voltage is applied to contacts 507 and 508, even momentarily, contact is made between 507 and 509 and remains in contact until the preset time interval has elapsed. When the time interval has elapsed, the circuit to 509 is broken until 507 and 508 are energized again. The time interval during the break period is long enough to allow the solenoid 140 to return by spring action and be ready for another stroke to move the slide drum one more position. In the advertising mode, contacts 507 and 508 only receive a momentary pulse through either top or bottom limit switches 164 or 166. The short pulse results because the instant the drum reaches its travel switch, 549 immediately reverses travel of the drum as has been explained, and moves off of either 164 or 166, depending on whether the movement is up or down. The pulse is long enough to start the timing action and not long enough to keep power on contacts 507 and 508 for the solenoid to start another stroke. Power is connected to limit switches 164 and 166 from contact 528 through line 541. They are connected in parallel and either limit switch can cause power to be fed to relay 550. When either limit switch closes by action of the drum, contact 551 is closed and a momentray pulse is produced to timer 506 to cause the stepping solenoid to make one stroke and move the slide drum one category.

During the advertising mode, only the viewing device of the machine is in operation and the operation of such viewing has been described previously.

It should be realized that anyone skilled in the art can make modifications to this basic embodiment to provide more customer convenience, safety to the machine, and provisions for fail-safe operation to prevent the customer from being cheated.

Thus, the present invention provides a combination of elements coacting to provide a result not achieved with known devices. The dispensing machine of the present invention provides a positive, safe, effective, and reliable machine for dispensing substantially flat elongated objects. The machine operates during three modes; namely, advertising mode, select mode, and buy mode. During the advertising mode only the viewing mechanism of the machine is in operation while the remainder of the mechanism of the machine is disabled. When the select mode is actuated, the advertising mode cooperates with the select mode to indicate the item which may be purchased. When the machine is switched from the select mode to the buy mode, the apparatus of the machine properly positions the dispensing means of the present invention to discharge the selected item. The machine will not operate to rob a customer of money in the event that a particular category has been sold out.

Although a preferred embodiment of the invention has been shown and described, it will be appreciated by those skilled in the art of vending mechanisms that many modifications and variations of the machine disclosed may be made without departing from the spirit of the invention as defined by the following claims. Particularly, it will be apparent that in place of a plurality of motors and gear reducers which have been utilized in the present disclosure, a continuously operable single motor might be utilized with various power take-off systems. Although the following claims define the invention, such claims have been presented in indented format to facilitate reading and understanding thereof. However, such indented format should not be construed as a structural or functional limitation of the elements or steps recited in such claims.

I claim:

1. An advertising system adapted for use with a dispensing machine, said advertising system including in combination
   storage means including a plurality of photographic slides representative of items available in said dispensing machine,
   motive means including horizontal motive means and vertical motive means coupled to said storage means for moving said storage means in horizontal and vertical directions, and
   viewing means including a screen and projector means coupled to said storage means to allow visual presentation of said photographic slides of items available in said dispensing machine.

2. A dispensing machine including in combination
   the advertising system of claim 1,
   selecting means coupled to said advertising system for allowing visual presentation of selected items stored in said machine, and
   buying means coupled to said selected means to provide selective discharge from said machine of an item stored in said machine.

3. A dispensing machine defined by claim 2 wherein said selecting means includes motive means, and storage system coupled to said motive means to selectively position said storage system.

4. Claim 3 combination, said system including in combination
   a plurality of storage plates positioned near each other but out of physical contact with each other, and
   positioning means coupled to said plurality of storage plates for selectively and positively positioning said plurality of storage plates.

5. Claim 4 combination, each plate including in combination
   a substantially flat, elongated member having an upwardly extending lip portion at one end and at least one downwardly extending lip portion intermediate the ends of said member, and
   positioning means coupled to the upper portion of said elongated member.

6. The combination of claim 5 wherein each storage plate includes a substantially flat, elongated member stored on said plate.

7. A dispensing machine defined by claim 2 wherein said buying means includes delivery slot means, and coin means for selectively providing discharge from said delivery slot means of items stored in said dispensing machine.

8. A dispensing machine including in combination,
   a housing having a viewing screen and an outlet chamber,
   advertising means disposed in said housing for visually showing on said viewing screen representations of items stored in said dispensing machine,
   selecting means responsive to manual operation for selectively positioning a group of irregularly shaped items stored in said dispensing machine near said outlet chamber of said housing, and
   actuating means coupled to said selecting means, said actuating means providing non-gravity discharge through the opening in said housing of one of the irregularly shaped items stored in said dispensing machine,
   wherein said actuating means includes
   a dispensing mechanism having
   worm means including a rotatable worm gear,
   platform means coupled to said worm means and responsive to rotation of said worm gear, and
   pusher assembly means coupled to said platform means, said pusher assembly means including an arm, a motor coupled to said arm, and switch means coupled to said arm, said worm means adapted for providing selected movement to said platform means in response to actuation of said switch means whereupon said motor provides movement to said arm until said motor is deenergized by said switch means.

9. A dispensing machine defined by claim 8 wherein said selecting means includes motive means and driven means coupled to said motive means, said motive means providing relative movement between said motive means and said driven means.

10. A dispensing machine including in combination,
    a housing having a viewing screen and an outlet chamber,
    advertising means disposed in said housing for visually showing on said viewing screen representations of items stored in said dispensing machine,
    selecting means responsive to manual operation for selectively positioning a group of irregularly shaped items stored in said dispensing machine near said outlet chamber of said housing, and
    actuating means coupled to said selecting means, said actuating means including a dispensing mechanism for providing non-gravity discharge through the opening in said housing of one of the irregularly shaped items stored in said dispensing machine,
    wherein said dispensing mechanism includes in combination
    worm means including a worm motor and a worm gear driven by said worm motor,
    platform means coupled to said worm means and responsive to rotation of said worm gear, and
    pusher assembly means coupled to said platform means whereby said worm means provide selected movement to said platform means.

11. A dispensing machine including
    an endless conveyor, a plurality of stacks of article banks carried by the conveyor, each bank including a plurality of article holders and guide means horizontally slidably mounting the holders one above the other,
    dispensing means including a platform mounted for vertical travel and and down and pusher means mounted on the platform for vertical travel up and down and horizontal movement, forth and back relative to the platform,
    conveyor drive means for moving the conveyor to successively dispose the stacks adjacent the dispenser means,
    selector means to move the platform to the level of a desired bank in a stack that is adjacent the dispenser means, and delivery means for moving the pusher means to the level of an article holder within said desired bank and moving the pusher means against said holder to push the holder horizontally in the guide means into a delivery position in which an article in the holder can be received by one operating the machine.

12. Combination of claim 11 including a slide carrier having slide support means thereon to support as many slides as there are article banks on the conveyor, said support means being arranged in columns equal in number to the number of stacks of article banks on the conveyor, projection means including a light source and a screen to display on the screen an image of a slide interposed between the source and screen.

mounting means mounting said slide carrier and projection means for relative movement therebetween to allow different ones of said slide support means to be in position to cause a slide thereon to be projected on said screen, and coupling means selectively to actuate the drive means for moving the conveyor and the selector means for moving the platform up and down to position the pusher means adjacent to particular ones of the card banks corresponding to predetermined particular ones of the slide apertures.

13. Combination of claim 12 including carrier drive means for causing said relative movement between the slide carrier and projection means, and decoupling means to render ineffective said coupling means so that said carrier drive means can move said slide carrier throughout the range of its possible positions for advertising purposes while said conveyor and platform remain stationary.

14. Combination of claim 13 including a blackout means to render the projection means ineffective to project on the screen a slide positioned on the slide support means that is disposed between the light source and screen, and article holder position responsive means to activate said blackout means when all article holders in a bank have been moved to said delivery position.

15. Combination of claim 13, said slide carried drive means including a shaft, means rotatably mounting the carrier on the shaft, a circular ratchet on the underside of the carrier, a pawl engaging the ratchet, motor means to reciprocate the ratchet, a sleeve axially slidably mounted on the shaft below the carrier, a rack connected to the sleeve, a pinion in engagement with the rack, and motor means to drive the pinion, switch means controlling said motor means, said switch means extending parallel to said shaft and having a plurality of circuit positions equal in number to the banks in a stack, and switch activator means connected to said carrier to activate said switch means to cause step by step axial motion of said carrier.

16. Combination of claim 15 including a second switch means extending parallel to said shaft and including as many circuit positions as said first switch means, said second switch means paralleling said first switch means and when activated rendering ineffective the first switch means in the corresponding circuit position, said second switch means being responsive to movement of said article holders and moving to closed position when ones of said article holders move to delivery position.

17. Combination of claim 12 including carrier drive means for causing said relative movement between the slide carrier and projection means, timer means to deactivate said carrier drive means for a period of time following each positioning of the slide carrier means in position with its slide support means squarely positioned between said light source and screen, and article holder position responsive means to deactivate said timer means when all article holders in a bank have been moved to delivery position.

18. Combination of claim 12 including coin controlled means to activate said delivery means to move the pusher means to the level of an article holder that has not previously been moved to delivery position and to cause the pusher means to move the last said article holder to delivery position.

19. Combination of claim 18 including gate means adjacent the dispenser means which in open position allows passage therethrough of an article extending from an article holder moved to delivery position, and interconnection means between said gate means and said coin controlled means to open said gate means when said delivery means is activated.

20. Combination of claim 18 including time responsive means to activate said decoupling means a predetermined time after there has been no activation of said conveyor drive means, selector means, and coin controlled means.

21. Combination of claim 18, said coin controlled means including a plurality of switch means activatable by different size coins, rotary switch means connected to the conveyor and having as many poles as there are stacks on the conveyor, a plurality of groups of patch panels, each panel having as many poles as there are banks in a stack, there being as many of said groups as there are stacks on the conveyor, each group including a base patch and at least one and up to as many price patches as there are of said switch means in said coin controlled means, each of said price patches being connected to one of said switch means, all of the poles of each price patch being connected together, each pole of each base patch being connected to one of the poles of one of the price patches in its group, all of the poles on each base patch being connected together, each base patch being connected to one of the poles of said rotary switch, said rotary switch and coin controlled switch means being in circuit with means controlling the operation of the dispensing means.

22. Combination of claim 12 including extreme order control means to actuate the selector means to move the platform to the level of the lowest bank in the adjacent stack whenever the conveyor drive means is actuated to move the conveyor to position a different stack adjacent the dispensing means.

23. Combination of claim 12, said slide carrier being of polyonal cross section and having a plurality of flat sides corresponding in number to the number of stacks on the conveyor, each side having a plurality of apertures therein corresponding to the number of banks in each stack, and slide support pins adjacent each aperture.

24. Combination of claim 23, said light source being disposed inside said carrier and said screen being disposed outside said carrier, a straight line connecting said screen and light source passing through said carrier.

25. Combination of claim 12 wherein said coupling means includes:
first switch means coupled to the conveyor drive means for movement thereby, said first switch means including a plurality of different circuit positions corresponding in number to the number of stacks on the conveyor,
second switch means coupled to the selector means for movement thereby, said second switch means including a plurality of different circuit positions corresponding to the number of banks of article holders in each stack,
third switch means coupled to the slide carrier for movement upon relative movement of the slide carrier and projection means in directions to position slide support means in different columns between the light source and screen, said third switch means including as many circuit positions as there are columns of slide support means,
fourth switch means coupled to the slide carrier for movement upon relative movement of the slide carrier and projection means in directions to position different slide support means in a particular column between the light source and screen, said fourth switch means including as many circuit positions as there are slide support means in a column,
electric circuit means interconnecting said first and third switch means to cause said drive means to move the conveyor until predetermined stacks thereon are opposite said dispensing means dependent upon which of the columns of article holders is positioned between the light source and screen, and
electric circuit means interconnecting said second and fourth switch means to cause said selector means to move the dispenser means until the platform is at the level of a predetermined bank in the column dependent upon which of the article holders in the column is positioned between the light source and screen.

26. Combination of claim 11 including
an annular slide carrier having slide support means thereon to support as many slides as there are article banks on the conveyor, said support means being arranged in columns disposed circumferentially around the axis of the carrier, said columns being equal in number to the number of stacks of article banks on the conveyor, the number of slide support means in each column equaling the number of banks of article holders in each stack,
projection means including a light source inside the slide carrier and a screen outside the slide carrier to display on the screen an image of a slide interposed between the source and screen,
mounting means mounting said slide carrier for movement relative to the projection means both axially and circumferentially through a range of positions in which different ones of said slide support means are in position to cause a slide thereon to be projected on said screen,
carrier rotation means to move the carrier about its axis to successively dispose different columns between the light source and screen,
carrier level means to move the carrier axially to successively dispose different slide support means in position such that a slide thereon is disposed between the light source and screen,
lateral follower means to cause the conveyor drive means to position the conveyor in positions determined by the rotational positions of the carrier, and
axial follower means to cause the selector means to position the platform in positions determined by the axial positions of the carrier.

27. Combination of claim 26,
said axial follower means including
first switch means having a plurality of circuit positions corresponding in number to the number of slide support means in a column and actuated to different ones of said circuit positions in accordance with the axial position of said carrier, and said combination further including
second switch means including a plurality of series of switch means, the number of said series equalling the number of stacks, each series having a plurality of circuit positions corresponding in number to the number of banks in a stack, said series of switch means paralleling said first switch means, said second switch means being activated by selected article holders, one in each bank, to render ineffective the first switch means when in a circuit position corresponding to that of said second switch means.

28. Combination of claim 26 including
decoupling means to render ineffective said lateral and axial follower means so that said carrier rotation and level means can move said slide carrier throughout the range of its possible positions for advertising purposes while said conveyor and platform are stationary, and
carrier order control means to actuate said carrier level means and carrier rotation means to move said carrier successively axially throughout its full range of travel, rotationally to the next column, axially in the opposite direction, rotationally to the next column, and in like manner thereafter.

29. Combination of claim 11, each guide means including
a pair of laterally spaced apart laterally notched strips with the notches in one strip aligned with those in the other,
each article holder comprising a tray having a width to span the lateral space between the notches.

30. Combination of claim 29 including
article retention spring clamp means on each tray,
each tray including stop means limiting the sliding of the tray relative to the strips, and
each tray including stop means limiting the sliding travel of an article held to the tray by the clamp means.

31. Combination of claim 11, said dispensing means including
a worm rotatably mounted on the platform and passing through a threaded aperture in a first part of the pusher means, a rack connected to a second part of said pusher means engaged by a pinion rotatably mounted on said first part of the pusher means, said second part being slidably mounted relative to said first part, motors driving said worm and pinion, limit switch means carried by said second part of the pusher means along the length thereof controlling the motor driving said pinion, and switch means at the end of the second part of the pusher means actuatable by engagement with an article holder upon vertical motion of the pusher means and controlling the motor driving the worm.

32. Combination of claim 11,
said conveyor comprising a plurality of rotatably mounted shafts, sprockets connected to each shaft at opposite ends thereof, chains connected to the set of sprockets at one set of ends of the shafts and the set of sprockets at the other ends of the shafts,
each stack comprising a pair of laterally spaced laterally notched strips connected at their ends to said chains,
said notches in one strip being colevel with those in the other strip of the stack,
said notches being arranged in groups with vertical spaces between the groups, each bank comprising the portions of said strips adjacent one of said groups.

References Cited

UNITED STATES PATENTS

| | | |
|---|---|---|
| 495,241 | 4/1893 | Braun. |
| 1,978,205 | 10/1934 | Ide. |
| 2,067,675 | 1/1937 | Kurtz. |
| 2,556,338 | 6/1951 | Pro. |
| 2,661,259 | 12/1953 | Rippon. |
| 2,890,781 | 6/1959 | Gore _____ 194—10 |
| 3,002,602 | 10/1961 | Glepen _____ 194—10 |

FOREIGN PATENTS 470,756  4/1952  Italy.

SAMUEL F. COLEMAN, Primary Examiner

U.S. Cl. X.R.

221—5, 78